US006839319B2

(12) United States Patent
Shimadoi et al.

(10) Patent No.: US 6,839,319 B2
(45) Date of Patent: Jan. 4, 2005

(54) OFFICE RECOGNITION METHOD IN RING NETWORK

(75) Inventors: Toru Shimadoi, Kawasaki (JP);
Hiroyuki Ohgaki, Kawasaki (JP);
Atsushi Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 787 days.

(21) Appl. No.: 09/864,030

(22) Filed: May 23, 2001

(65) Prior Publication Data

US 2002/0067700 A1 Jun. 6, 2002

(30) Foreign Application Priority Data

Dec. 4, 2000 (JP) ........................................ 2000-368162

(51) Int. Cl.$^7$ .............................................. G01R 31/08
(52) U.S. Cl. ........................ 370/222; 370/228; 370/258
(58) Field of Search ................................. 370/217, 218, 370/219, 220, 222, 223, 224, 225, 228, 242, 244, 248, 250, 403, 404, 405, 406, 258

(56) References Cited

U.S. PATENT DOCUMENTS

| | | | | |
|---|---|---|---|---|
| 5,737,310 A | * | 4/1998 | Goto | 370/222 |
| 5,757,768 A | * | 5/1998 | Goto et al. | 370/222 |
| 6,657,969 B1 | * | 12/2003 | Neuendorff et al. | 370/245 |
| 6,674,714 B1 | * | 1/2004 | Mochizuki et al. | 370/217 |

* cited by examiner

*Primary Examiner*—Phirin Sam
(74) *Attorney, Agent, or Firm*—Katten Muchin Zavis Rosenman

(57) ABSTRACT

A ring network has first and second network connecting offices for connecting ring networks together and for dropping a signal from a terminal office. Each node of the ring network recognizes whether it is the first network connecting office based upon channel setting information. A first node, which has been recognized as being the first network connecting office, executes a squelch-table creation procedure between itself and other nodes based upon the channel setting information, thereby identifying a second node, which is the second network connecting office. The first node embeds office identification information in a squelch table of a protection channel and sends this information to the second node. The second node recognizes that it itself is the second network connecting office based upon the office identification information.

13 Claims, 36 Drawing Sheets

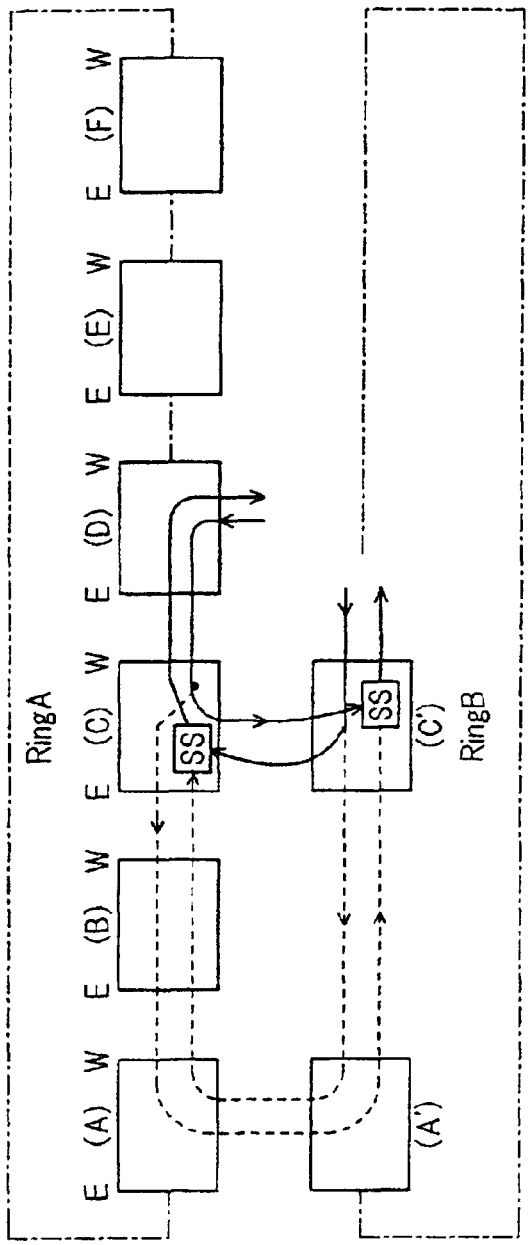

EAST→WEST (EW DIRECTION)

EAST←WEST (WE DIRECTION)

SQUELCH TABLE

|  | WEST Side | | EAST Side | | DIRECTION |
|---|---|---|---|---|---|
| Ch1 (CN1) | Source | Destination | Source | Destination | W←E |
|  | Destination | Source | Destination | Source | W→E |
| ≀ | ≀ | ≀ | ≀ | ≀ | ≀ |
| Ch. n | ... | ... | ... | ... | ... |

OFFICE RECOGNITION METHOD IN RING NETWORK

BACKGROUND OF THE INVENTION

This invention relates to a ring-network office recognition method and, more particularly, to a method of recognizing an office in a ring network having first and second network connecting offices for connecting ring networks together and for dropping a signal from a terminal office.

Synchronous optical networks (SONET), which utilize optical communication that is capable of high-capacity transmission, have become widespread owing to an increase in communication traffic. With SONET, user data undergoes multiplexed transmission in accordance with a Synchronous Transport Signal (STS-N) frame (where N represents an integer) format. FIG. 18A is a diagram showing the structure of a 51.84-Mbps STS-1 frame. The frame has 9×90 bytes overall (810 bytes/125 µs), of which 3×9 bytes constitute overhead OH and 87×9 bytes constitute an STS-payload STS-1 SPE (Synchronous Payload Envelope). Nine bytes of the payload constitute path overhead POH, and VT (Virtual Tributary) packets of multiple channels are multiplexed onto the remaining 86×9 bytes. With SONET, frame formats other than the STS-1 frame format mentioned above include STS-3 (155.52 Mbps), STS-12 (622.08 Mbps) and STS-48 (2.488 Gbps). These frame formats can be used in appropriate fashion by optical transmission lines.

Ring Structure

A ring structure in which a transmitting apparatus is connected in the form of a ring from the viewpoint of assuring reliability is known as a network configuration for SONET. The ring structure is such that if a failure occurs in a transmission path, the transmission can be continued via an alternative transmission path, thereby making it possible to improve the reliability of transmission. FIG. 19 is a block diagram illustrating the structure of an ADM (Add/Drop Mux) transmitting apparatus that can be ring-connected. FIG. 20 is a diagram useful in describing the ring structure.

The ADM transmitting apparatus is terminal equipment having a MUX (multiplexing) function and an add/drop function. More specifically, the apparatus has a cross-connect function and an add/drop function for a lower order side (the tributary side). Line interfaces (LINE IF) 1a, 1b receive higher order signals (e.g., OC-48: 2.488-Bbps optical signals) from optical transmission lines $8a_1$, $8b_2$ on WEST and EAST sides, respectively, convert these signals to electrical signals and execute processing based upon overhead information. Demultiplexers (DMUX) 2a, 2b demultiplex higher order signals into lower order signals (e.g., STS-1 electrical signals), an STS/VT cross-connect unit 3 performs cross-connect on the STS level, multiplexers (MUX) 4a, 4b multiplex the cross-connected STS-1 signals into higher order signals and line interfaces (LINE IF) 5a, 5b add overhead to these higher order signals, convert the signals to optical signals and send the optical signals to optical transmission lines $8a_2$, $8b_1$ on the EAST and WEST sides, respectively. It should be noted that a signal direction in which a signal is input to the EAST side of the transmitting apparatus (node) and output from the WEST side shall be referred to as the EW (EAST→WEST) direction, and that a signal direction in which a signal is input to the WEST side of the transmitting apparatus (node) and output from the EAST side shall be referred to as the WE (WEST→EAST) direction.

The STS/VT cross-connect unit 3 switches, on the STS level, STS-1 signals inserted from tributary interfaces 6a, 6b, . . . via MUX/DMUXs 7a, 7b, . . . and sends these switched signals in the WE or EW direction. The STS/VT cross-connect unit 3 also drops signals, which have been received from the transmission path from the WE or EW direction, on the tributary side, demultiplexes these signals to lower order signals of a prescribed speed via the MUX/DMUXs 7a, 7b, . . . and sends the signals to the tributary side from the tributary interfaces 6a, 6b, . . . . The transmission paths in the WE and EW directions both have working and protection channels assigned to them. For example, in case of OC-48, $1^{st}$ to $24^{th}$ channels of the 48 STS-1 channels are working channels and $25^{th}$ to $48^{th}$ channels are protection channels. The transmitting apparatus normally transmits signals using the working channel. When a failure occurs, rescue is performed using a protection channel.

Protection at Time of Transmission-path Failure

In accordance with the ring architecture, ADM transmitters 10a to 10d are connected in the form of a ring, as shown in FIG. 20. If a certain transmission path develops a failure or suffers a decline in quality, signals are transmitted in a direction that avoids this transmission path, thereby allowing communication to continue and assuring reliability and quality. Networks in which multiple nodes have been connected into a ring can be classified broadly into two types of schemes, namely a UPSR (Uni-directional Path Switched Ring) scheme and a BLSR (Bi-directional Line Switched Ring) scheme. In comparison with the UPSR scheme, the BLSR scheme is advantageous in that channel capacity can be enlarged because the same channel can be used between different nodes.

The BLSR scheme is such that if failures occur at a plurality of locations and sever a ring transmission path, a signal that cannot reach a destination node may be produced and the signal may be transmitted to another node by loop-back for rescue purposes. In order to prevent such misconnection, squelch is performed. In the squelch operation, a P-AIS (Path Alarm Indication Signal) is transmitted upon inserting the signal, on a per-channel basis, in the signal that cannot reach the target node.

FIG. 21 is a diagram useful in describing rescue from failure. With the UPSR scheme, as shown at (a), the same signal is sent in the EW direction from a node (C) to a node (B) and in the WE direction from the node (C) to a node (D) by, e.g., a channel ch. 1, and a node (A) selects and receives the signal of channel ch. 1 by a path switch PathSW. Accordingly, even if a failure develops between nodes (A) and (B), as shown in (b) of FIG. 21, node (A) is capable of selecting and receiving the signal on channel ch. 1 via node (D) by the path switch PathSW, thereby allowing communication between nodes C and A to continue.

With the BLSR scheme, as shown at (c) in FIG. 21, the node (C) sends a signal node (A) by channel ch. 1 in, e.g., the EW direction and sends a signal to node (D) by channel ch. 1 in the WE direction, and node (D) sends the signal to node (A) by channel ch. 1 in the WE direction. In other words, communication is possible between nodes (C) and (A), between nodes (C) and (D) and between nodes (D) and (A) using the same channel ch. 1. Channel capacity, therefore, can be enlarged as compared with the UPSR scheme.

The BLSR scheme is such that if a failure develops between nodes (A) and (B), as depicted in (d) of FIG. 21, rescue is performed by an ASP (Automatic Protection Switch) protocol using K1, K2 bytes. Specifically, node (B) loops back working channel ch. 1 to protection channel ch.

25 indicated by the dot-and-dash line, and the protection channel ch. 25 is switched over to working channel ch. 1 at node (A), whereby communication between nodes (C) and (A) is allowed to continue. It should be noted that communication between nodes (C) and (D) is performed on channel ch. 1 and that communication between nodes (D) and (A) also is performed on ch. 1 because such communication does not traverse the faulty segment.

FIGS. 22 to 25 are diagrams useful in describing the APS protocol, in which WK represents a working channel and PT a protection channel. Nodes (A) to (H) are connected in a ring configuration by different transmission paths in each of WE and EW direction, and a working channel and protection channel are assigned to each transmission path.

FIG. 22 illustrates a case where communication is performed bi-directionally between nodes (A) and (E). If under these circumstances a failure occurs between nodes (F) and (E) in the transmission path in the EW direction, as shown in FIG. 23, node (E) detects an alarm, becomes a switching node and sends the opposing node (F) switching requests (SF-RING; Signal Failure Ring) 51, 52, which indicate transmission-path failure, in both of short-path and long-path directions, respectively, in accordance with the APS protocol. The switching requests are created using the K1, K2 bytes of overhead (see FIG. 18B). If, upon receiving the switching requests, the nodes (D), (C), (B), (A), (H) and (G) recognize that the destination of request 52 is node (F) and not these nodes themselves, a state of full pass-through is established and the signal is allowed to pass through the protection channel. Upon receiving the request 51 on the short path, node (F) becomes a switching node, sends a reverse request (RR-RING; Reverse Request Ring) over the short path and sends a request 53 (SF-RING), which is identical with the received request 52, over the long path.

In the event of a failure, bridging and switching are executed simultaneously at reception of the request from the long path. Bridging represents a state in which the same traffic is sent by being switched from a working channel to a protection channel, and switching represents a state in which traffic from a protection channel is sent upon being switched to a working channel. Accordingly, owing to occurrence of the failure between nodes (F) and (E), node (E) forms a bridge and sends the signal destined for node (A) to the protection channel PT, as indicated by the dashed line in FIG. 24, and node (F) forms a switch for switching the protection channel PT to the working channel WK from node (F) in the direction toward node (A), as indicated by the dashed line in FIG. 24. The foregoing illustrates rescue of a signal from node (E) to node (A), though a signal from node (A) to node (E) can be rescued in a similar manner. More specifically, as shown in FIG. 25, in this case node (F) forms a bridge for looping back a signal, which was directed from node (A) to node (E) over the working channel, to the protection channel PT, and node (E) performs switching to switch from the protection channel PT to the working channel.

The bytes K1, K2 used in the APS protocol are contained in the section overhead SOH, as shown in FIG. 18B. The K1 byte comprises a switching request of $1^{st}$ to $4^{th}$ bits and a remote office ID (the identification number of the node that is the destination of the K1 byte) of $5^{th}$ to $8^{th}$ bytes, and the K2 byte comprises a local office ID (the identification number of the node generating the request) of $1^{st}$ to $4^{th}$ bits, a $5^{th}$ bit indicating whether the request is a short-path request ("0") or a long-path request ("1"), and status of $6^{th}$ to $8^{th}$ bits. The switching request of the K1 byte is such that "1011" represents the above-mentioned SF-RING, "0001" represents the RR-RING and "0000" represents no request. If status represented by the K2 byte is "111", this indicates an AIS (Alarm Indication Signal).

Squelch

Since the same channel can be used by multiple paths in a BLSR network, misconnection of paths occurs if failures develop at multiple locations. In order to prevent such misconnection, the P-AIS (Path Alarm Indication Signal) is inserted, on a per-channel basis, in the signal affected by the misconnection. This operation for inserting the P-AIS is referred to as "squelch". A squelch table is used to execute squelch. The content of a squelch table specifies the add/drop node of each channel and is set in each node. As shown in FIG. 26A, a node has EAST and WEST sides. The direction in which a signal advances from the EAST to the WEST side through the node is referred to as the EW direction, and direction in which a signal advances from the WEST to the EAST side through the node is referred to as the WE direction. As shown in FIG. 26B, the squelch table describes add/drop nodes in the WE and EW directions with regard to each of the EAST and WEST sides of the node on a per-channel basis. The add node is entered in the source-office name field of the squelch table and the drop node is entered in the destination-office name field. Accordingly, on the presumption that communication is performed bi-directionally between nodes (A) and (E), between nodes (A) and (C) and between nodes (C) and (E), as shown in FIG. 27, squelch tables SQTL-A through SQTL-H of respective ones of the nodes (A) through (H) become as illustrated. It should be noted that these squelch tables have been created using the node IDs of nodes (A) to (H).

Thus, the squelch tables are used to determine whether signals on respective channels can be rescued by loop-back if failures develop at two or more locations in a ring. There is the possibility that a signal judged to be unrescuable based upon the result of the determination made by a squelch table will be output from the wrong node, namely a node different from that intended. Squelch is executed if occurrence of such a misconnection is likely. The node that executes squelch is a switching node, and it does so when failures occur at two or more locations in a ring. Squelch is not executed in the following cases:

(1) when failures have occurred at both ends of the local node (i.e., when the local node is isolated);
(2) when a failure has not occurred on either side of the local node (i.e., when the local node is not a switching node); and
(3) when bridging or switching is not actually being performed.

Reference will be had to FIG. 28 to describe squelch decision processing at node (E) in a case where failure has occurred between node (E) and (D) and between nodes (F) and (G) simultaneously. If squelch is not executed, a signal on channel ch. 1 from node (A) to node (E) is looped back to the protection channel ch. 25 by a bridging function at node (G), and the protection channel ch. 25 is looped back to the working channel ch. 1 by a switching function at node (D), thereby causing a misconnection in which the signal from node (A) to node (E) is transmitted to node (D). Further, a signal on channel ch. 1 from node (E) to node (C) is looped back to the protection channel ch. 25 by a bridging function at node (E), and the signal is looped back to the working channel ch. 1 by a switching function at node (F), thereby causing a misconnection in which the signal from node (E) to node (C) is transmitted to a lower order group via node (E).

Accordingly, if multiple failures have occurred, (1) the locations of the failures are identified, (2) nodes at which signals will not arrive from the faulty locations are found from the ring topology, (3) reference is had to the squelch tables to determine whether the nodes that have been entered in these tables are nodes at which signals will not arrive, and (4) if a node is one at which a signal will not arrive, then squelch is executed.

Ring topology is the topology obtained by arraying the names of nodes that construct the ring clockwise in order starting from the node of interest. FIG. 28 illustrates ring topology RTG of node (E). It is ascertained from the faulty locations and ring topology RTG of FIG. 28 that nodes at which signals will not arrive are the nodes of node IDs 9, 6, 4, 1, 14, 3. It is determined whether source and destination nodes that have been entered in a squelch table SQTL-E of node (E) match nodes at which signals will not arrive. Since it is found that node (C) of node ID 14 and node (A) of node ID 4 are nodes at which signals will not arrive, squelch is executed. In other words, squelch is executed at the switching nodes (D), (E), (F) and (G) by inserting P-AIS in each of the channel signals after bridging and after switching.

FIGS. 29A and 29B are diagrams useful in describing single failure and multiple failures. FIG. 29A is for a case where a single failure has occurred and FIG. 29B for a case where multiple failures have occurred.

If a single transmission-path failure SF occurs between nodes (F) and (E), as shown in FIG. 29A, and node (E) detects the failure SF (Single Failure), the node (E) operates in a manner similar to that described above in connection with FIG. 23. That is, node (E) (1) sends a switching request 61 (SF-R/F/E/Long) in the long-path direction to the node (F) of the opposing office and (2) sends a switching request 62 (SF-R/F/E/Srt/RDI) in the short-path direction to the node (F). In the event of the single failure, node (F) receives the short-path and long-path switching requests 61, 62, which are destined for its own office, sent from the node (E) of the opposing office, and therefore determines the occurrence of a single failure in one direction between the nodes (F) and (E).

If a failure occurs between nodes (B) and (C) and between nodes (F) and (E), as shown in FIG. 29B, node (C) detects a transmission-path failure SF1 and node (E) detects a transmission-path failure SF2, then nodes (C), (E) generate request signals. Specifically, in response to detection of failure SF1, node (C) sends a long-path switching request 63 (SF-R/B/C/Long) to the node (B) of the opposing office and sends a short-path switching request 64 (SF-R/B/C/Srt/RDI) to node (B). Upon receiving the short-path request 64, node (B) sends a long-path switching request 65 (SF-R/C/B/Long) to node (C).

Further, upon sensing the transmission-path failure SF2, node (E) sends a long-path switching request 66 (SF-R/F/E/Long) to node (F) of the opposing office and sends a short-path switching request 67 (SF-R/F/E/Srt/RDI) to node (F) in a manner similar to that of the single-failure case of FIG. 29A. In response to receipt of the short-path switching request 67, node (F) sends a long-path switching request 68 (SF-R/E/F/Long) to node (E). Node (F), from the fact that the long-path switching request 65 (SF-R/C/B/Long) is not destined for its own office but is directed from node (B) to node (C) of another office despite the fact that the short-path switching request 67 (SF-R/F/E/Srt/RDI) is directed to its own office from node (E), judges that failures (multiple failures) have occurred between nodes (F) and (E) and between nodes (B) and (C).

Construction of Ring Topology

FIGS. 30A to 30C are diagrams useful in describing the construction of a ring topology.

In a system in which four nodes (A) to (D) are connected by a ring transmission path RL, an identification number is assigned to each node, as shown in FIG. 30A. For example, 15, 3, 7 and 8 are assigned as the IDs of nodes (A), (B), (C) and (D), respectively. Next, as shown in FIG. 30B, (1) node (A), which specifies the construction of the ring topology (ring map), sends a ring topology frame RTGF, in which the inserted-node number is 1 and ID 15 of its own node is assigned to the first field. The ring topology frame RTGF is sent in the clockwise direction, by way of example. (2) Next, node (B) sends a ring topology frame RTGF, in which the inserted-node number is 2 and the ID of its own node is inserted following the ID of node (A). (3) Similarly, node (C) sends a ring topology frame RTGF, in which the inserted-node number is 3 and the ID of its own node is inserted following the ID of node (B), and (4) node (D) sends a ring topology frame RTGF, in which the inserted-node number is 4 and the ID of its own node is inserted following the ID of node (C).

(5) Since the first inserted-node ID is its own node ID, node (A) recognizes that the frame has come full circle and, as shown in FIG. 30C, transmits the ring topology frame RTGF upon inserting an END flag at the end thereof, whereby each node is notified of the completed ring topology frame. Each node that has received this ring topology frame constructs a ring topology with its own node at the head. For example, the topology is "15, 3, 7, 8" at node (A), "3, 7, 8, 15" at node (B), "7, 8, 15, 3" at node (C) and "8, 15, 3, 7" at node (D). Such a ring topology makes it easy to send a local node ID and a target node ID using the K1, K2 bytes in accordance with the APS protocol.

FIGS. 31 to 35 are diagrams useful in describing the formation of squelch tables. The nodes (A) to (D) have respective ones of squelch tables storing node IDs. For the sake of simplicity, however, characters the same as those of the nodes (A) to (D) will be used as the node IDs. Further, each squelch table has a structure for specifying an add/drop node with regard to the EW and WE directions, as shown in FIG. 26A. However, to simplify the description, add/drop nodes only in the EW diction are shown. If signals are sent and received in the EW direction between the nodes (C) and (D) via the nodes (B), (A), add node (C) inserts its own node ID "C" into a squelch table SQTL-A and then transmits the table to the side of node (B), as indicated at (1) in FIG. 31, thereby reporting the fact that node (C) is an add node. Further, drop node (D) also inserts its own node ID "D" into a squelch table SQTL-D and then transmits the table to the side of node (A), thereby reporting the fact that node (D) is a drop node. It should be noted the asterisk and star marks signify that the other parties are unknown.

Next, as indicated at (2) in FIG. 32, node (A) notifies node (B) that the drop node is node (D), and node (B) notifies node (A) that the add node is node (C). Next, as indicated at (3) in FIG. 32, node (B) notifies node (C) that the drop node is node (C), and node (A) notifies node (D) that the add node is node (C). Thus, the local node ID (="C") and the drop node ID (="D") of the opposing office are set in the WEST fields of the squelch table SQTL-C of the add node (C), and the local node ID (="D") and the drop node ID (="C") of the opposing office are set in the EAST fields of the squelch table SQTL-D of the add node (D).

Next, on the basis of the completed squelch tables, node (C) notifies node (B) that the unknown party * is node (D), and node (D) notifies node (A) that the unknown party P is node (C), as indicated at (4) in FIG. 34. Finally, node (B)

notifies node (A) that the unknown party * is node (D), and node (A) notifies node (B) that the unknown party P is node (C), as indicated at (5) in FIG. 35. As a result, squelch tables SQTL-A, SQTL-B are completed also at nodes (A) and (B).

In a case where one optical-fiber transmission line has working channels ch. 1 to ch. 24 and protection channels ch. 25 to ch. 48, channels that are rescued by loop-back at the occurrence of failure are only the working channels ch. 1 to ch. 24. Accordingly, it will suffice to create squelch tables solely for the working channels ch. 1 to ch. 24.

2-Fiber BLSR Scheme and 4-Fiber BLSR Scheme

As shown in FIG. 36A, a 2-fiber BLSR scheme uses one transmission line (fiber) in each of the WE and EW directions. A working channel and a protection (or extra) channel are assigned to each transmission line. If a failure occurs in the working channel of one transmission line, loop-back is performed so that the signal is transmitted via the protection channel of the other transmission line.

As shown in FIG. 36B, a 4-fiber BLSR scheme provides two transmission lines, namely a working transmission line and a protection transmission line, in the WE direction, and two transmission lines, namely a working transmission line and a protection transmission line, in the EW direction, and transmission is performed using these four transmission lines.

The 4-fiber BLSR scheme differs from the 2-fiber BLSR scheme as follows:

(1) The working and protection channels are accommodated in different fibers.

With the 2-fiber scheme, protection is performed using one-half the working channel. As a consequence, traffic for maintaining the band must be accommodated in less than one-half the total. With the 4-fiber scheme, all traffic can be looped back using the protection fiber. However, under ordinary conditions only extra traffic can be passed through the protection fiber.

(2) With the 4-fiber BLSR scheme, a span switch is used. For a failure that cannot be rescued by the span switch, loop-back is performed using a ring switch.

The 4-fiber BLSR scheme is such that if a failure occurs only in a working fiber, as shown in (a) of FIG. 37, span changeover is performed using a span bridge switch SPB, a span switch SPS and the protection fiber. However, a span changeover is not carried out even a failure occurs in the protection fiber. Further, with the 4-fiber BLSR, loop-back is performed by ring switches RSW1, RSW2 if failures occur simultaneously in two fibers of the same direction, as illustrated at (b) in FIG. 37.

Service Selector SS

A BLSR network can be expanded up to a maximum of 16 nodes; more than 16 nodes cannot be accommodated. This limitation on network expansion can be avoided by connecting a certain BLSR network A and another BLSR network B via a ring interconnection. Ordinarily, as shown in FIG. 38, a ring interconnection is implemented by interconnecting a tributary (lower order channel) of a prescribed node E in the BLSR network A and a tributary of a prescribed node C' in the other BLSR network B. With this approach, however, any failure that might occur between the connected nodes E and C' cannot be rescued and would result in loss of communication between the rings.

Accordingly, line survivability in the event of node failure is enhanced by interconnecting two tributary connection offices in each of the BLSR networks A and B, as illustrated in FIG. 39. In accordance with this connection, service selectors (SS1, SS2) of primary nodes in respective ones of the networks perform switching (path switching) of a signal dropped from another network and a signal that enters from a secondary node within the same network. This is for the purpose of performing rescue in the event of a failure. For example, a signal of a prescribed channel that has been sent from a node (A)' of BLSR network B enters the service selector SS2 of the BLSR network A via a drop side and a continue side. The service selector SS2 normally selects the channel signal that enters from the continue side and sends this signal to the node (A). If a failure in the transmission path occurs at point F under these conditions, the service selector SS2 subsequently selects the channel signal that enters from the drop side and sends this signal to node (A) to continue communication.

Thus, in accordance with the connection scheme shown in FIG. 39, rescue in the event of a failure between the BLSR networks A and B can be implemented by the path switching function and a path setting function, which is referred to as DCW (Drop & Continue on Working Bandwidth), of the service selector switches SS1, SS2. However, in order to realize the ring interconnection with the connection method of FIG. 39, a working channel must be used in the connection between the primary office and the secondary office. As a consequence, the connection method of FIG. 39 detracts from line use efficiency, which is one advantage of the BLSR network, meaning that the characteristics of the BLSR network cannot be exploited effectively.

With regard to this problem, the ITU-T recommends that the connection between the offices of the ring interconnection within the same network be implemented not by a working channel but by a protection channel, as shown in FIG. 40.

In the recommended connection arrangement, a primary office (node A-1) drops a signal (an added signal from a lower order group) from a terminal office (node A-n) within the same BLSR network A and uses the protection channel to deliver the signal from the terminal office to the secondary office (node A-2). Further, the primary office (node A-1) forms a path switch (service selector) SS between a signal (an added signal from the lower order group) from a terminal office (not shown) within a different network B and a signal received from the secondary office (node A-2) using the protection channel, and forms a cross-connect that delivers a signal of excellent quality to the terminal office (node A-n) within the same network. Further, the secondary office (node A-2) forms a cross-connect that drops a signal received from the primary office (node A-1) via the protection channel and delivers an added signal from the lower order group to the primary office (node A-1) via the protection channel.

Because of the characteristics of a BLSR network, a line that uses a protection channel is referred to as a PCA (Protection Channel Access=Extra Traffic) line and has a low priority. If any node performs line rescue when a failure occurs in the network, the PCA line becomes the rescue line and communication via this PCA line can no longer be carried out. In other words, if the connection method of FIG. 40 is implemented as is without changing the conventional BLSR function, the specially provided ring interconnection becomes meaningless. That is, even through the line in question can be rescued, there is a possibility that that the line will not be rescued.

The ITU-T recommendation merely recommends a ring interconnection using a protection channel but does not specifically state how this should be implemented; the method of implementation is left to the communication service provider.

SUMMARY OF THE INVENTION

Accordingly, an object of the present invention is to avoid the foregoing problem by using a switching method specific to a ring interconnection.

Another object of the present invention is to so make possible communication through a PCA line between offices of a ring interconnection when a failure occurs.

A further object of the present invention is to arrange it so that a node serving as a secondary office can recognize that it itself is a secondary office automatically, and so that this node can recognize which node is a primary office or terminal office (add/drop office).

A further object of the present invention is to so arrange it that a secondary office performs path switching that conforms to the point at which a failure has occurred, thereby making it possible to rescue communication between BLSR networks even in the event of a failure.

Yet another object of the present invention is to arrange it so that identification of a network-forming office can be performed without interfering with the conventional procedure for constructing squelch tables, and so that there will be no drastic change in the content of squelch-table information in a conventional BLSR network.

According to the present invention, the foregoing objects are attained by providing a method of recognizing an office of a ring network having first and second network connecting offices for connecting ring networks together and for dropping a signals from a terminal office. In the office recognition method, (1) each node recognizes which node it is based upon channel setting information; (2) a first node, which has been recognized as being the first network connecting office or a terminal office, executes a procedure, which is for creating squelch tables of working and protection channels, between itself and other nodes based upon the channel setting information, and (3) identifies a second node, which is the second network connecting office, by the procedure for creating a squelch table of the protection channel; and (4) the first node embeds office identification information in the squelch table of the protection channel and sends this information to the second node, and the second node recognizes that it itself is the second network connecting office based upon the office identification information.

If this arrangement is adopted, each node can recognize which office it is as well as which offices other nodes are automatically. In the event of a failure, therefore, each node is capable of continuing communication between rings using a switching method specific to ring interconnection, and it can be arranged so that communication can be carried out through a PCA line between offices in a ring connection. Further, it is possible to arrange it so that identification of an office in a network arrangement can be performed without interfering with the conventional procedure for constructing squelch tables, and so that there will be no drastic change in the content of squelch-table information in a conventional BLSR network.

Further, a ring topology is constructed. Depending upon whether two offices consisting of a source office and a destination office that have been entered in a source-office name field and a destination-office name field, respectively, of a squelch table are arrayed in a sequence that agrees with an array sequence of the ring topology, the second node determines whether it is a DCP (Drop and Continue Protection Bandwidth)-implemented second network connecting office in which a terminal office exists outside the first and second network connecting offices, or a DTP (Dual Transport on Protection Bandwidth)-implemented second network connecting office in which a terminal office exists intermediate first and second network connecting offices. If this arrangement is adopted, an office can be identified in both DCP and DTP arrangements and communication between rings can be continued even if a failure occurs.

Further, in a network in which first and second ring networks are connected via an intermediate ring network in which a channel is unterminated, the above-described recognition method is applied to office recognition of first and second network connecting offices of the intermediate ring network for connection to the first ring network and to office recognition of third and fourth network connecting offices of the intermediate ring network for connection to the second ring network, and office recognition of the entire intermediate ring network is performed by sending and receiving squelch tables, in which office identification information has been embedded, between a network connecting office on the side of the first ring network and a network connecting office on the side of the second ring network. If this arrangement is adopted, each node can perform a path switching operation, which conforms to points where failures have occurred, even in an arrangement connecting three ring networks. This makes it possible to continue communication between rings even in the event of a failure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a diagram showing a DCP arrangement and useful in describing processing for office identification according to the present invention;

FIG. 11 is a diagram useful in describing the composition of a squelch table;

Figure 1:
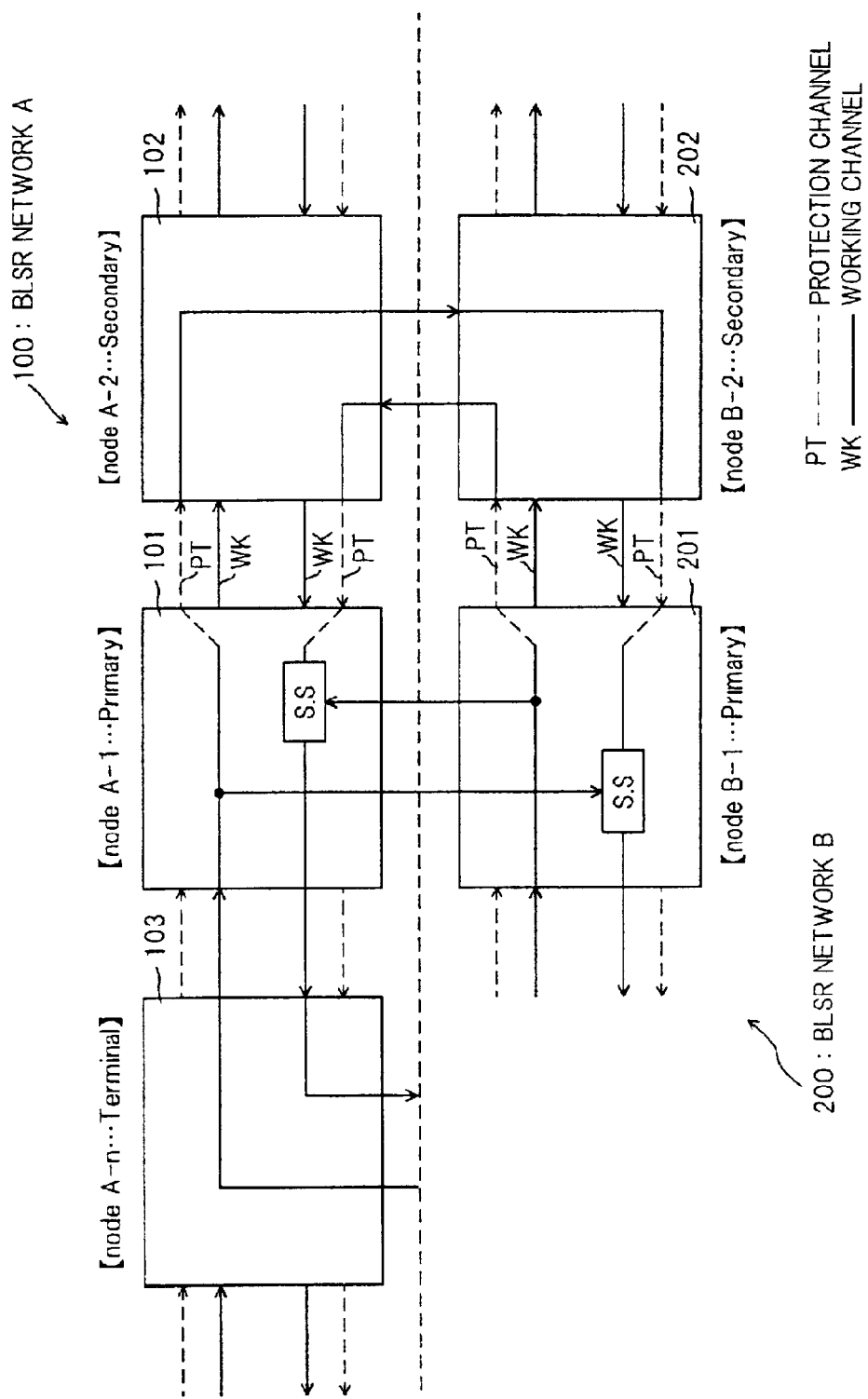
FIG. 1 a diagram of an arrangement (DCP arrangement) in which a primary office and a secondary office in the same network are connected via a protection channel.

DESCRIPTION OF THE PREFERRED EMBODIMENTS (A) Overview of the Present Invention Operation of Secondary Office in Response to Occurrence of Failure According to the present invention, as shown in FIG. 1, the connection between a primary office 101 (201) and a secondary office 102 (202) in the same network is performed using a protection channel in accordance with the ITU-U recommendation when interconnecting a first BLSR network (A) 100 and a second BLSR network (B) 200. If a failure occurs, the secondary office performs a prescribed path switching operation or a PCA-access inhibit operation depending upon the location of the failure.

Figure 2:
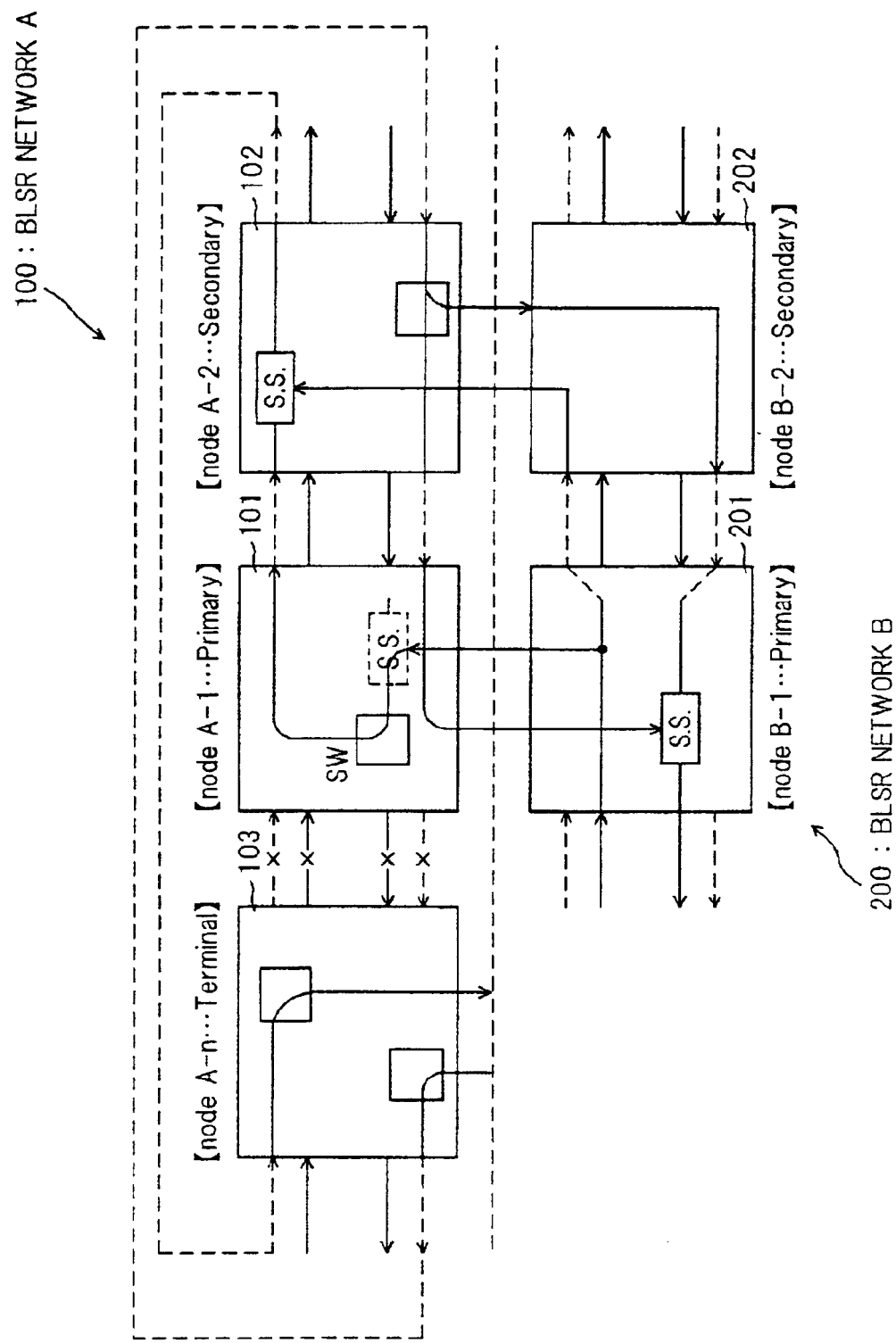
FIG. 2 is a diagram useful in describing signal paths when a first failure occurs.

FIG. 2 is a diagram useful in describing the operation of the secondary office 102 in the first BLSR network (A) 100 when a failure occurs in the transmission path between a terminal office 103 and the primary office 101.

If the failure occurs in at least the working channel of the transmission path, the secondary office 102 performs (1) a service selector operation in which either a signal that enters from the primary office 101 or a signal that enters by being dropped from the secondary office 202 of the other network is selected by a selector switch SS and sent to the terminal office 103 via the protection channel, and (2) an operation in which a signal sent in via the protection channel by the bridging function of the terminal office 103 is dropped and input to the secondary office 202 and the same signal is input to the primary office 101. If this arrangement is adopted, the secondary office 102 is capable of continuing PCA access despite the occurrence of a failure in the transmission path between the terminal office 103 and primary office 101. Moreover, the secondary office 102 is capable of continuing communication between a prescribed node on the side of network B and the terminal office 103 on the side of network A without exerting any influence upon the side of network B.

Figure 3:
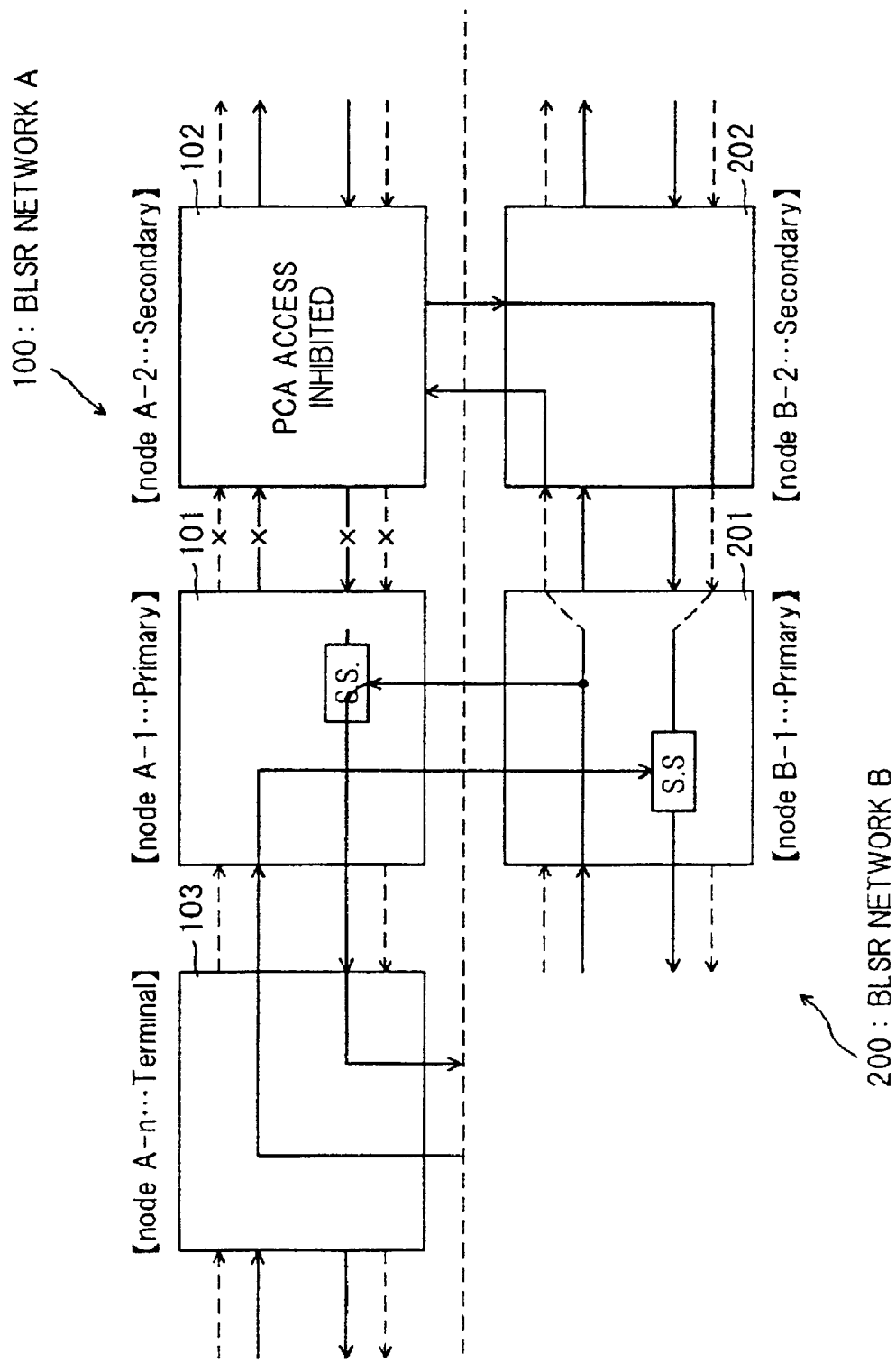
FIG. 3 is a diagram useful in describing signal paths when a second failure occurs.

FIG. 3 is a diagram useful in describing the operation of the secondary office 102 in the first BLSR network (A) 100 when a failure occurs at least in the protection channel of the transmission path between the primary office 101 and secondary office 102.

If a failure occurs in the above-mentioned transmission path, the secondary office 102 inhibits PCA access. As a result, node 102 no longer operates as an office for implementing a ring interconnection. However, even though node 102 no longer operates as a secondary office, communication between a prescribed node on the side of network B and the terminal office 103 on the side of network A can be continued via the selector switches SS of the primary offices 101 and 201.

Figure 4:
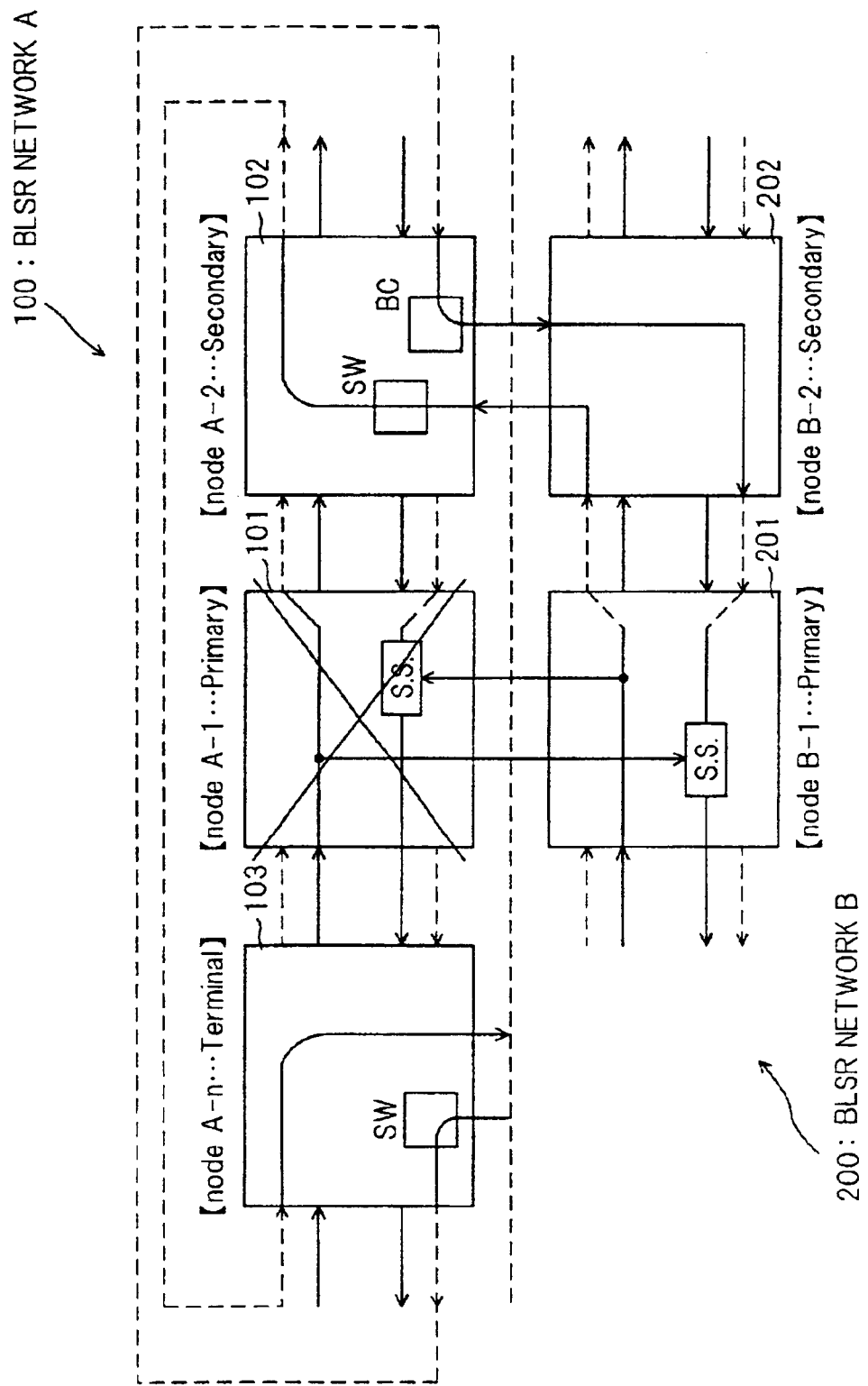
FIG. 4 is a diagram useful in describing signal paths when a third failure occurs.

FIG. 4 is a diagram useful in describing the operation of the secondary office 102 in the first BLSR network (A) 100 when a failure occurs in the primary office 101.

If the failure occurs in the primary office 101, the secondary office 102 performs (1) a switching operation in which a signal dropped from the secondary office 202 of the other network is selected and sent to the terminal office 103 via the protection channel, and (2) a signal-path switching operation in which a signal sent in via the protection channel by the bridging function of the terminal office 103 is dropped and input to the secondary office 202. If this arrangement is adopted, the secondary office 102 is capable of continuing PCA access despite the occurrence of a failure in the primary office 101. Moreover, the secondary office 102 is capable of continuing communication between a prescribed node on the side of network B and the terminal office 103 on the side of network A without exerting any influence upon the side of network B.

It should be noted that even if a failure occurs at points other than those mentioned above, the secondary office 102 continues PCA access and continues functioning as an office for implementing the ring connection.

If the secondary office 102 is capable of operating in dependence upon the point at which failure occurs, it can be so arranged that communication via the PCA line between offices implementing the ring interconnection will not be prevented by the occurrence of a failure, thereby allowing communication between ring networks to be continued.

Identification of Secondary Office

In order for the secondary office to execute the above-described operation conforming to the point at which a failure occurs, it is necessary (1) for the secondary office to identify at what location in the same network the failure has occurred, and (2) for the node to identify whether it itself is the primary office, the secondary office or a mere terminal office (add/drop office). That is, it is necessary for an office to operate upon recognizing whether it itself is a terminal office, a primary office or secondary office forming a ring interconnection, or a mere through-office.

With regard to (1), the point at which a failure has occurred can be specified in accordance with the ASP protocol using the K1, K2 bytes that flow through the transmission path. With regard to (2), which nodes are the primary office, secondary office, terminal office and through-office can be set by the operator. However, the setting operation is troublesome and may result in setting errors. It is desirable, therefore, that the setting be performed automatically. Accordingly, it is so arranged that each node can identify whether it is a primary office, secondary office, terminal office or through-office using squelch tables and channel-setting information, which are shared link-information media within a BLSR network. More specifically, each node recognizes whether it is a primary office based upon channel-setting information concerning this node. Further, a procedure is provided for constructing squelch tables and, under the guidance of the node serving as the primary office, nodes identify automatically whether they are a secondary office, terminal office or through-office. In this case, it is necessary to adapt the squelch table in such a manner that it will not change drastically the content of squelch-table information in the conventional BLSR network.

(B) Structure of Transmitting Apparatus

Figure 5:
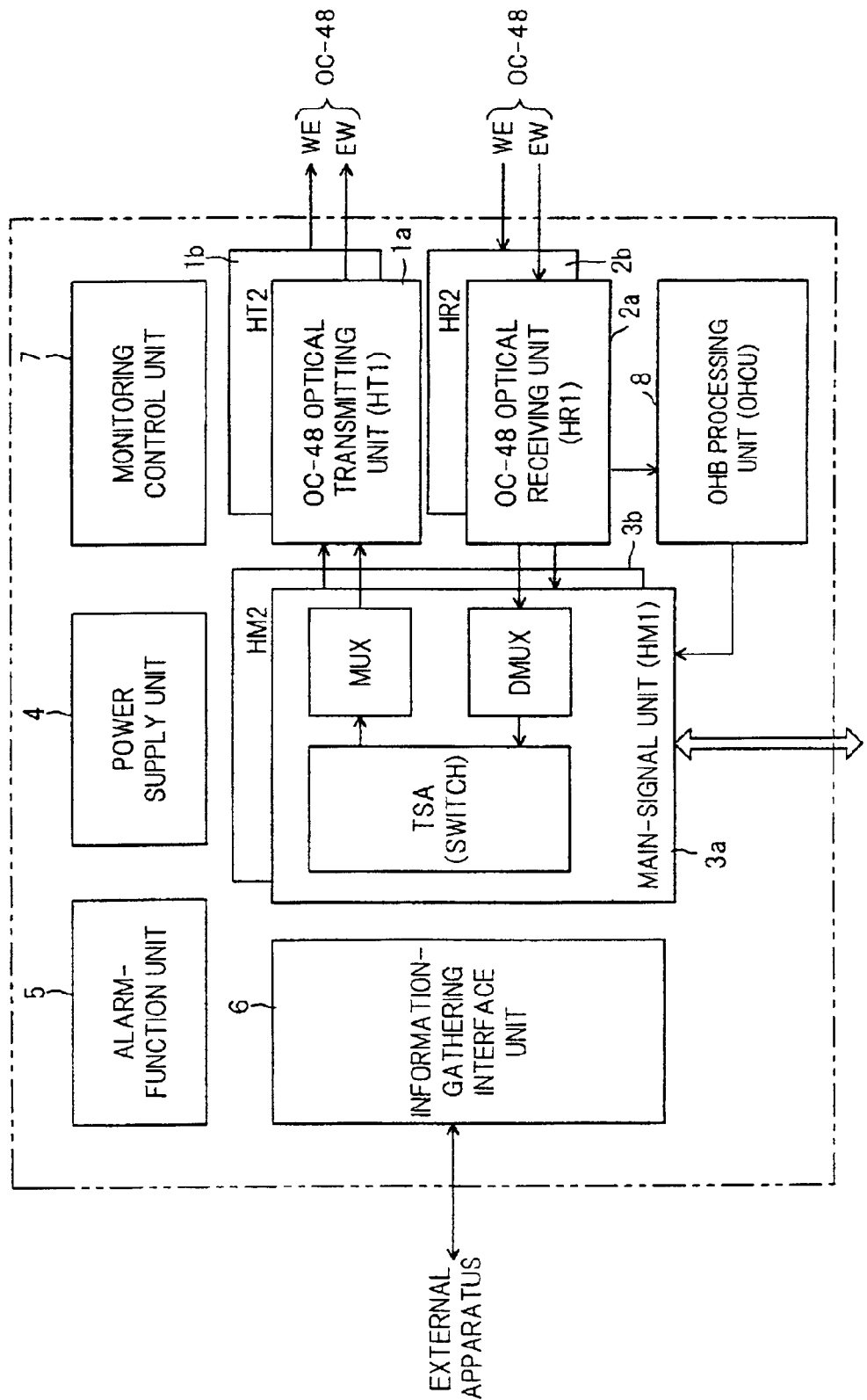
FIG. 5 is a block diagram showing the overall structure of a transmitting apparatus.

FIG. 5 is a block diagram showing the overall structure of a transmitting apparatus (node). The transmitting apparatus has OC-48 optical transmission units (HT1, HT2) 1a, 1b in EW and WE directions, respectively, and OC-48 optical receiving units (HR1, HR2) 2a, 2b in EW and WE directions, respectively, as OC-48 optical-signal interface units, by way of example. The optical transmitting units 1a, 1b convert STS-48 electric signals to OC-48 optical signals and transmit the optical signals. The optical receiving units 2a, 2b convert OC-48 optical signals to STS-48 electric signals. Main-signal units (HM1, HM2) 3a, 3b are used to multiplex and demultiplex the STS-48 electric signals. The transmitting apparatus includes, in addition to the above-mentioned units, a power supply unit 4; an alarm-function unit 5 having an alarm function and an order-wire function; an information-gathering interface unit 6 having a function for gathering information within the transmitting apparatus and a function for interfacing an external monitoring device; a monitoring control unit 7 for administering monitoring and control functions within a shelf; and a overhead-byte processing unit 8 for controlling line switching of OC-48 signals and processing overhead bytes OHB of the OC-48 signals in accordance with the ASP protocol that is based upon K1, K2 bytes.

Figure 6:
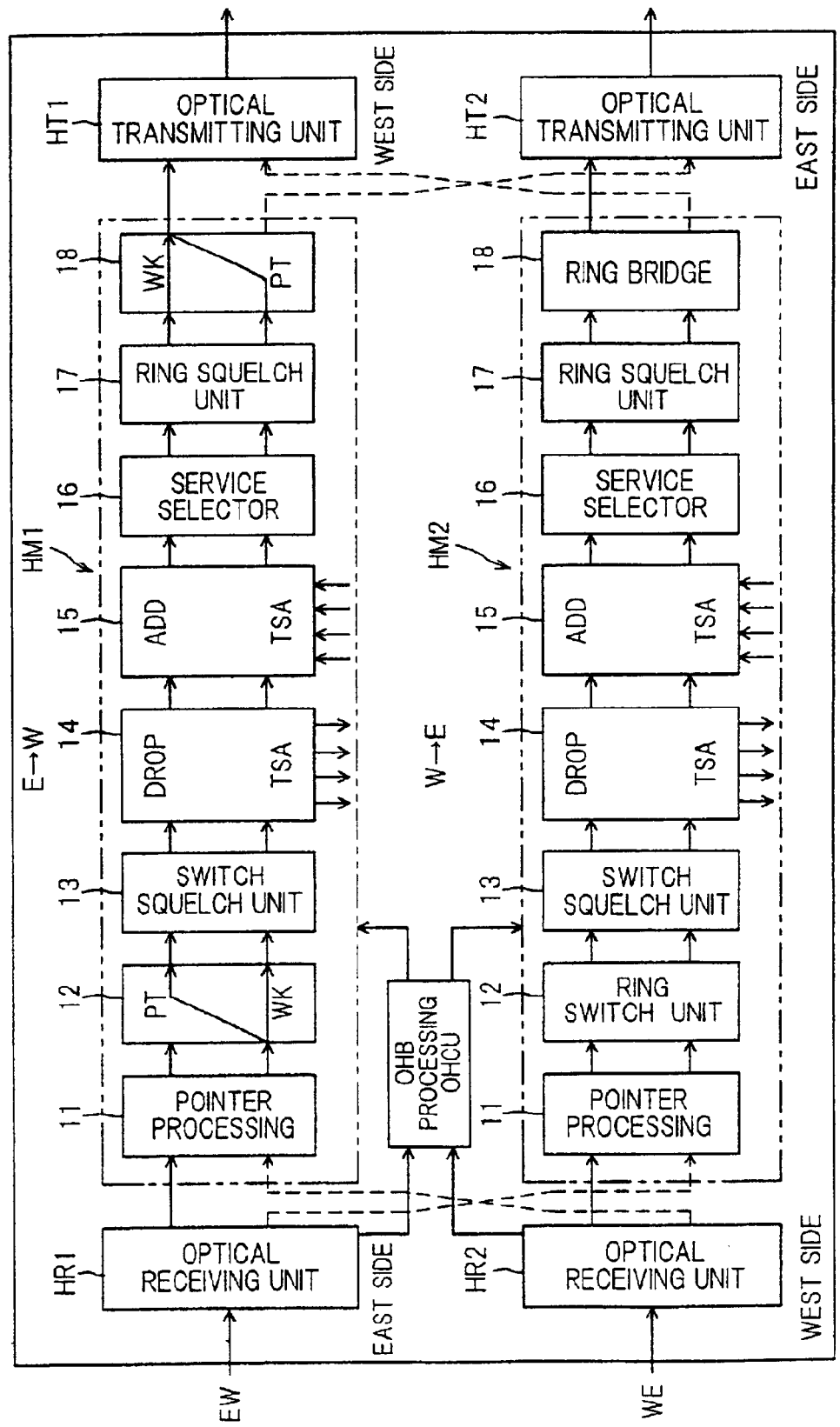
FIG. 6 is a block diagram showing the details of main-signal units.

FIG. 6 is a block diagram of the transmitting apparatus in which the main-signal units are shown in detail. Components identical with those shown in FIG. 5 are designated by like reference characters. Shown in FIG. 6 are an optical receiving unit HR1 on the EAST side, an optical transmitting unit HT1 on the WEST side, and the main-signal unit HM1 provided between these two units. These units construct a signal path in the EW direction. Also shown in FIG. 6 are an optical receiving unit HR2 on the WEST side, an optical transmitting unit HT2 on the EAST side, and the main-signal unit HM2 provided between these two units. These units construct a signal path in the WE direction. The main-signal units HM1, HM2 have the same structure. In FIG. 6, the positions of the components in the signal path of the WE direction are shown reversed from their true positions.

Each of the main-signal paths HM1, HM2 has a pointer processing unit 11, a ring switch 12, a switch squelch unit 13, a demultiplexing time-slot assignment unit (DROP TSA) 14, an insertion time-slot assignment unit (ADD TSA) 15, a service selector 16, a ring squelch unit 17 and a ring bridge 18. By way of example, the pointer processing unit 11 controls each unit upon identifying the leading position of a signal that has been multiplexed by a pointer based upon the H1 to H3 bytes of section overhead SOH. The ring switch 12 and ring bridge 18 execute line switching, which conforms to a point of failure, in accordance with the ASP protocol in response to a command from an overhead processing unit OHCU. The service selector 16 selects and outputs a prescribed signal in response to a command from the overhead processing unit OHCU. The switch squelch unit 13 and ring squelch unit 17 refer to a squelch table and execute squelch for inserting P-AIS when a signal is incapable of arriving owing to the occurrence of multiple failures.

With the two-fiber scheme, nodes can be interconnected for transmission in both directions by two OC-48 optical transmission lines in the WE and EW directions. Each transmission line has, e.g., 48 channels as single-channel units, channels ch.1 to ch. 24 of these 48 channels serve as working channels and channels ch. 25 to ch. 48 serve as protection channels. In accordance with this arrangement, communication in the event of a failure can be continued by switching the signal path in dependence upon the point of the failure by relying upon the bridging function, switching function and service-selector function.

(C) Types of Ring Interconnections

There are two schemes for interconnecting two BLSR networks, namely a DCP (Drop and Continue on Protection Bandwidth) scheme and a DTP (Dual Transport on Protection Bandwidth) scheme. The DCP scheme has the connection arrangement already illustrated in FIGS. 1 to 4. Here the connection between the primary office 101 and secondary office 102 in the same network is performed using the protection channel, and the terminal office 103 is placed outside the primary office 101 and secondary office 102.

Figure 7A:
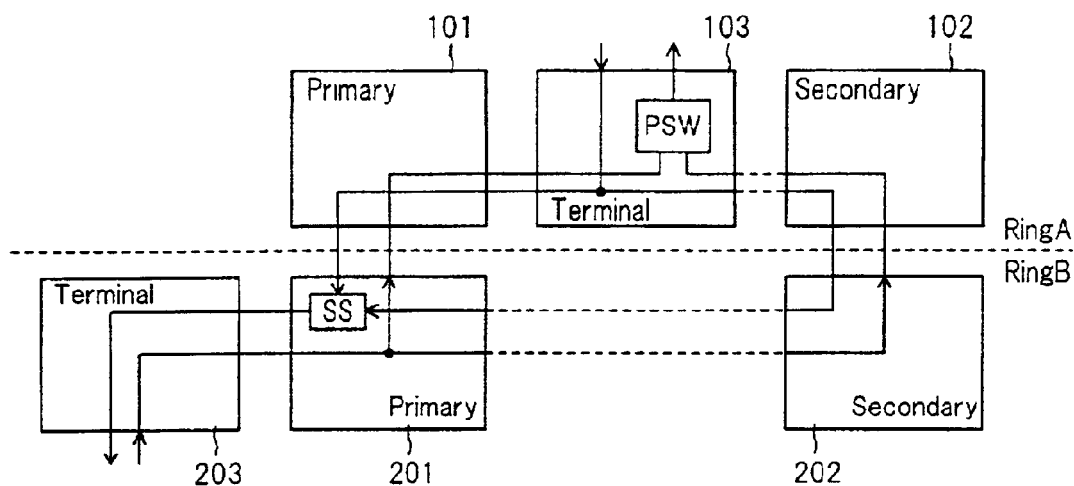
FIGS. 7A and 7B are diagrams of DTP arrangements.
Figure 7B:
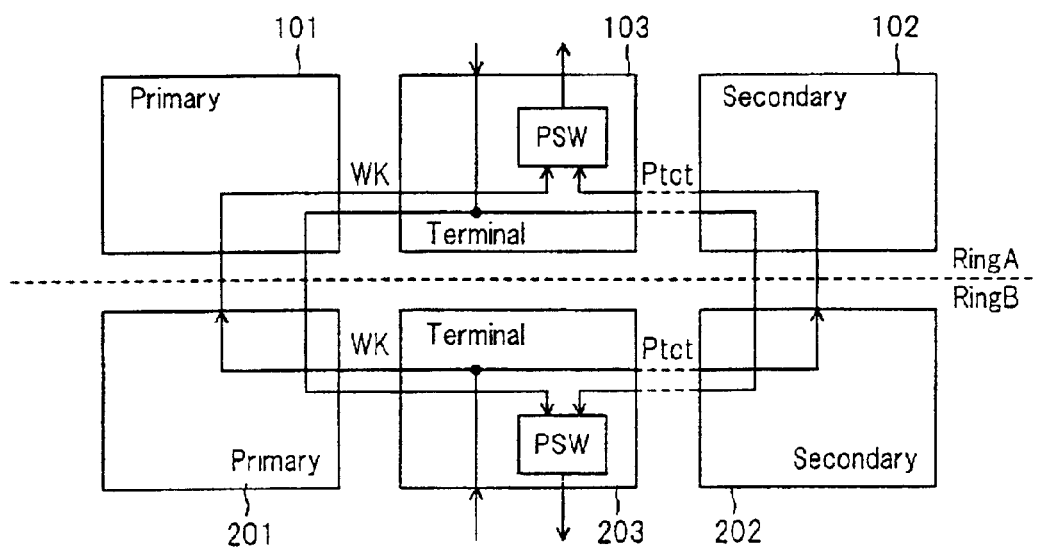
Figure 8A:
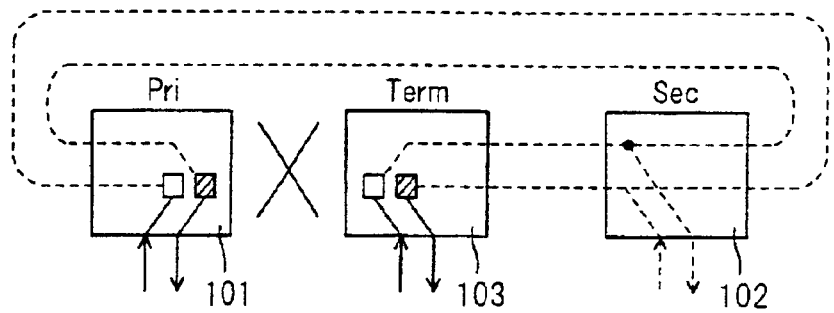
FIGS. 8A to 8E are diagrams useful in describing signal paths when failures occur in a DTP arrangement.
Figure 8B:
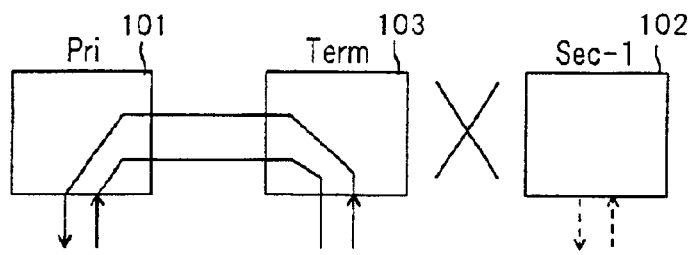
Figure 8C:
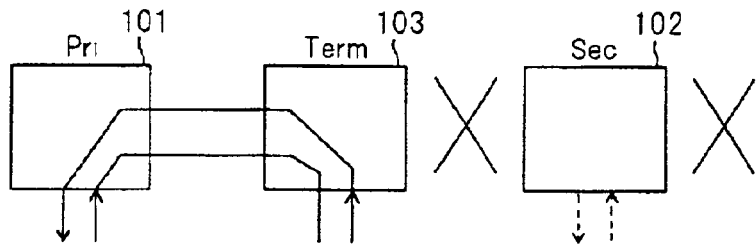
Figure 8D:
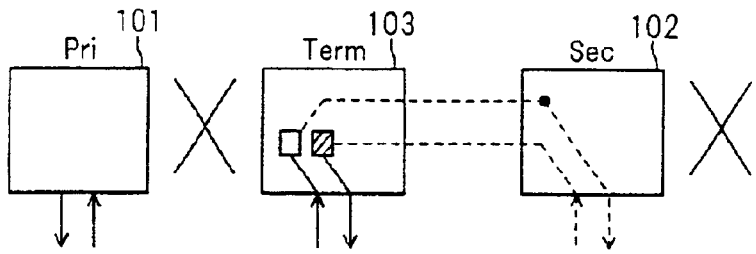
Figure 8E:
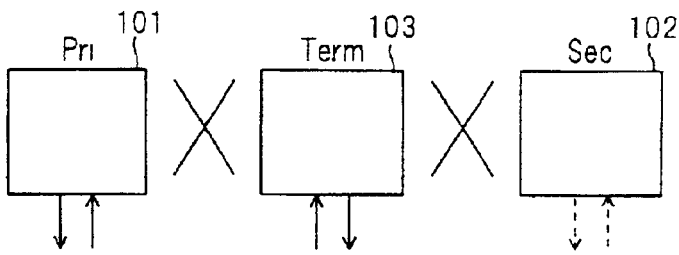

The DTP scheme, on the other hand, places the terminal office 103 between the primary office 101 and secondary office 102, as shown in FIGS. 7A, 7B. Ring connections of the kinds shown in FIGS. 7A, 7B exist. The ring connection of FIG. 7A is for a case where the connection arrangement in another ring network is a DCP arrangement, and the ring connection of FIG. 7B is for a case where the connection arrangement in another ring network is a DTP arrangement.

In the DTP arrangement, the terminal office 103 inputs a signal to be sent to another BLSR network to the primary office 101 via the working channel and inputs the signal to the secondary office 102 via the protection channel. The primary office 101 and secondary office 201 both drop the signals, which have entered from the terminal office 103, in the direction of the primary office 201 and secondary office 202. Further, using a path switch PSW, the terminal office 103 selects and drops a signal that enters from the primary office 101 via the working channel or a signal that enters from the secondary office 102 via the protection channel.

If failures occur in this DTP arrangement, the signal paths become as shown in FIGS. 8A to 8E in dependence upon the point of the failure. The x marks in these drawings indicate the failure points.

(D) Processing for Identifying Ring-connected Offices

Processing for Identifying Offices Having the DCP Arrangement

Figure 9:
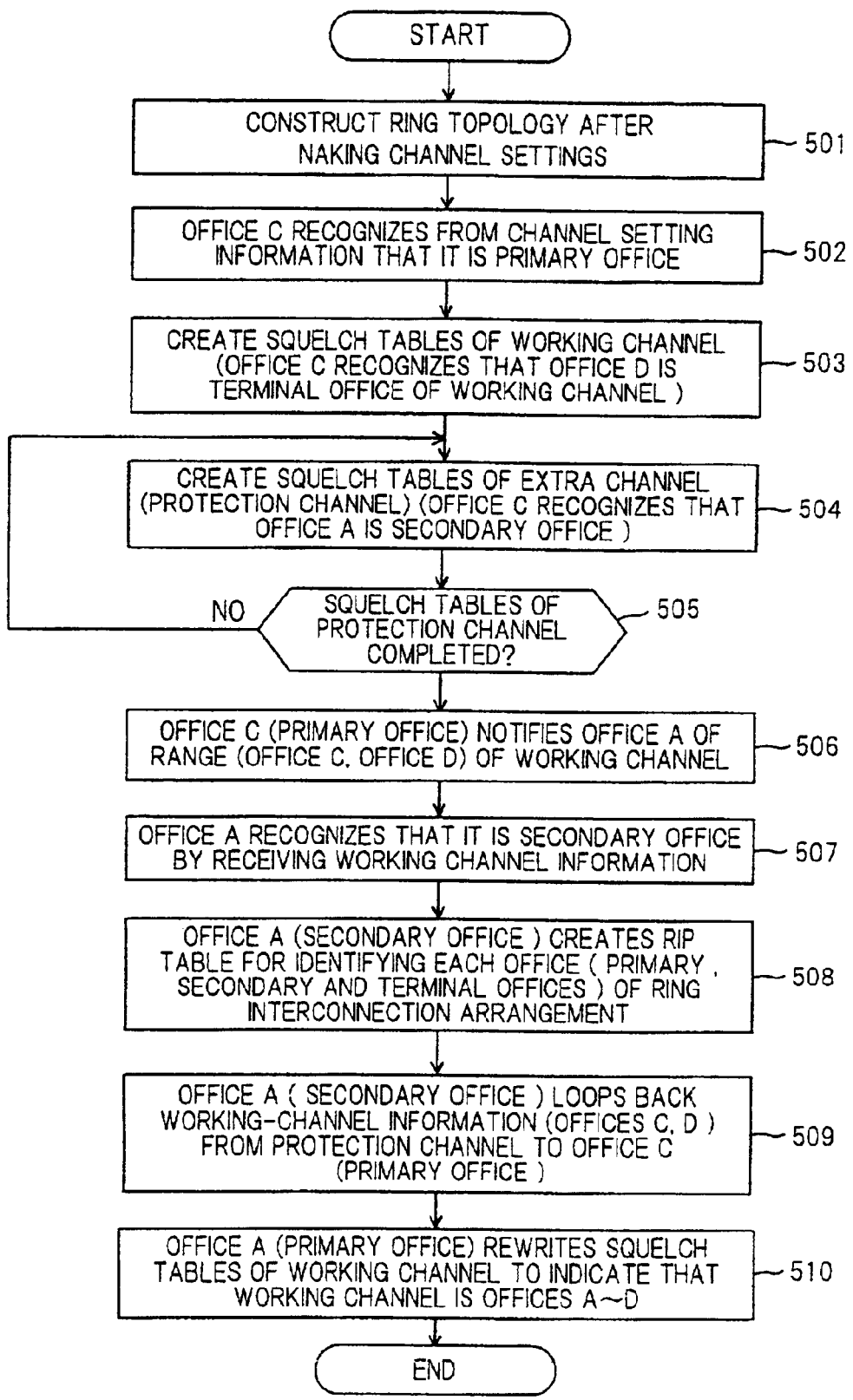
FIG. 9 is a flowchart of processing for identifying a ring-connected office.

It is required that each node identify whether it is a primary office, secondary office or terminal office (add/drop office). Moreover, it is required that a secondary office identify which node is a primary office and which is a terminal office (add/drop office). FIG. 9 is a flowchart of processing for identifying a ring-connected office.

The operator performs an operation for assigning a node ID to each node and for setting a channel for each node. The channel setting is for setting cross-connect information on a per-channel basis. By referring to this channel-setting information in the example of the DCP arrangement shown in FIG. 10, it is determined that:

(1) a node (D) has undergone a channel setting as an add/drop node in a prescribed channel of working channels;

(2) a node (A) has undergone a channel setting as an add/drop node in a prescribed channel of protection channels; and (3) a node (C) has undergone a channel setting as a primary office of a DCP arrangement.

In the examples of the DTP arrangements of FIGS. 7A, 7B, it is determined from the channel-setting information that the node 103 has been set as a terminal office of the DTP arrangement.

After the channel settings have been made, a ring topology is constructed (step 501).

Among the network connecting offices for interconnecting ring networks in the DCP arrangement of FIG. 10, the node (C), which has undergone a channel setting as the primary office of the DCP arrangement, recognizes that it itself is the primary office and operates as the anchor point of a procedure for an operation for recognizing the offices of the ring network. Though the description to follow relates to the DCP arrangement of FIG. 10, processing can be executed in similar fashion in the case of the DTP arrangement as well.

In the example of the DCP arrangement of FIG. 10, the node (C) undergoes a channel setting to serve as the primary office of the DCP arrangement and therefore the node (C) recognizes that it is the primary office (step 502). In the examples of the DTP arrangements of FIGS. 7A, 7B, the node 103 has undergone a channel setting to serve as the terminal office of the DTP arrangement and therefore the node 103 recognizes that it is the terminal office of the DTP arrangement.

Next, the primary office (C) and the node (D) (the add/drop node in the working line) create squelch tables with regard to a prescribed channel of the working line by the conventional procedure for constructing squelch tables. It is assumed that the squelch tables are constructed as shown in FIG. 11.

As a result of creation of the squelch tables of the working line, the primary office (C) recognizes that node (D) is the terminal office (step 503). The upper row of (a) in FIG. 12 shows the squelch tables of the working channel created by the above-described processing.

Next, the primary office (C) and the node (A) (the add/drop node in the protection line) create squelch tables with regard to a protection channel by the conventional procedure for constructing squelch tables (step 504). Specifically, the termination of the line is recognized by attaching the node ID of the local office to the received information and then looping it back.

The primary office (C) waits for creation of the squelch tables in the protection channel to be completed (step 505). If completion of creation of the squelch table at node (A) is recognized, the primary office (C) judges that the node (A) is the secondary office. The lower part of (a) in FIG. 12 shows the squelch tables of the protection channel. It should be noted that at this point in time, node (A) has not yet determined whether it is the secondary office; it can merely recognize that it is a PCA (Protection Channel Access) office.

Figure 12:
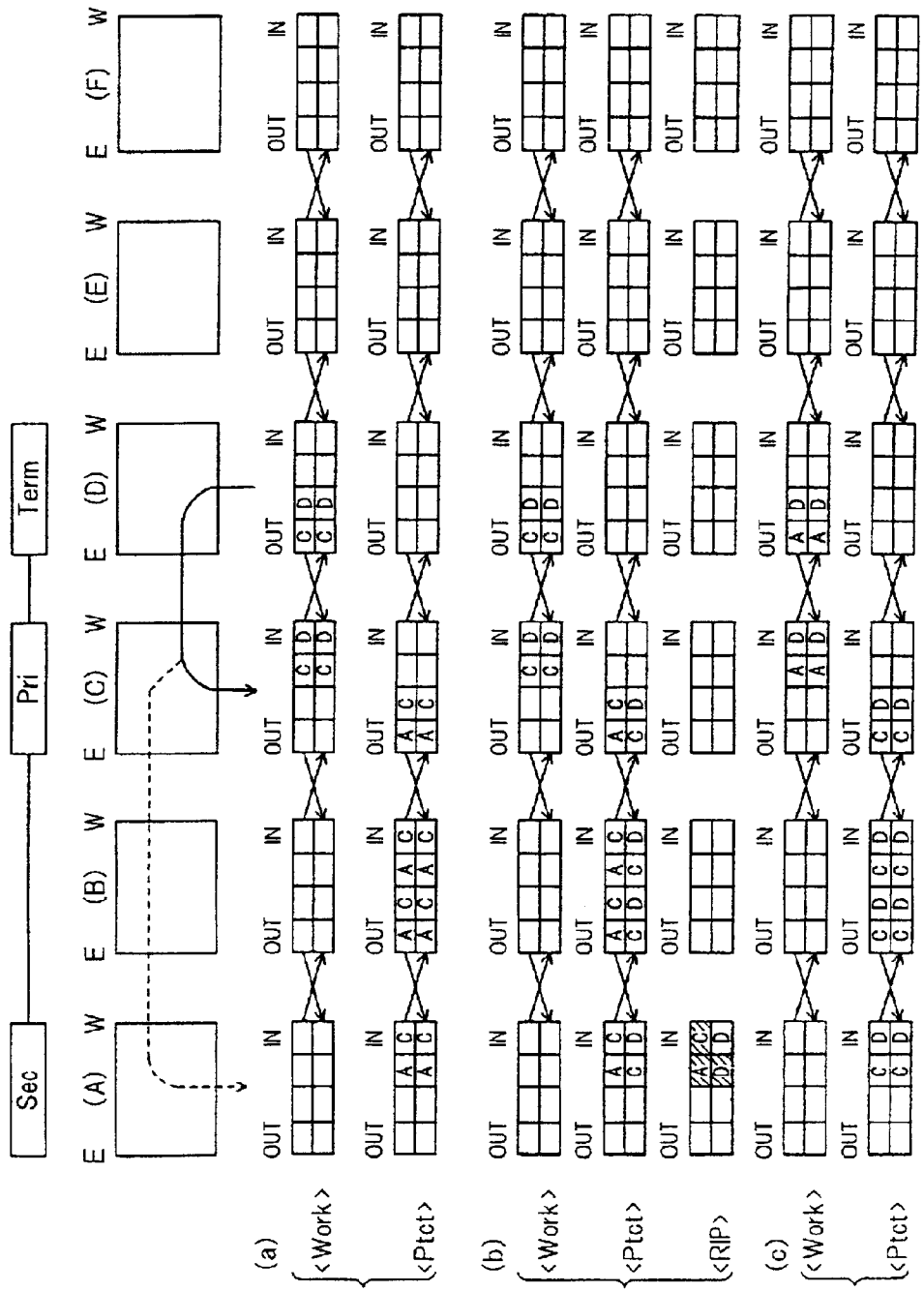
FIG. 12 is a diagram showing squelch tables and useful in describing office identification according to the present invention.

If the primary office (C) recognizes completion of the squelch table at office (A), it uses the squelch tables [see the middle row at (b) in FIG. 12] of the protection channel to report the range [office (C) to office (D)] of the working channel to node (A), which accommodates the protection channel (step 506).

By receiving the information of the working channel, node (A) recognizes that it is the secondary office (step 507) and recognizes the node information of each office of the ring interconnection arrangement (step 508). More specifically, by receiving the range [office (C)–office (D)] of the working channel, node (A) recognizes that it is a secondary office, identifies, from the range of the working channel, which node is the primary office, which is the terminal office and which is the through-office (an office that merely passes a signal), and creates an RIP (Ring Interconnection Protection) table [see the lower row at (b) in FIG. 12]. By using the information thus acquired, the secondary office (A) can implement a line rescue operation if a line failure occurs when rings are interconnected.

If creation of the RIP table is completed, the secondary office (A) loops back the working-channel information (offices C, D) to the primary office (C) via the protection channel using the squelch tables [step 509; see the lower row at (c) in FIG. 12].

By acquiring the above-described information, the primary office (C) recognizes completion of construction of the squelch tables of the protection channel, i.e., judges that node (A) has correctly recognized that it is the secondary office, regards the working channel as being offices (A) to (D) and writes A, D over the squelch tables of the working channel [step 510; see the upper row at (c) in FIG. 12]. The reason for this is that it can be assumed that the nodes (A), (D) are add/drop nodes of the working channel owing to the DCP channel settings. It should be noted that the content of the squelch tables of the protection channel is not used in operation. The foregoing completes processing for identifying ring-connected offices.

Processing for Identifying Offices Having the DTP Arrangement

The foregoing relates to the DCP arrangement. Processing involving the DTP arrangement will now be described. In the description that follows, steps corresponding to those shown in FIG. 9 are designated by like step numbers. In the examples of the DTP arrangements of FIG. 7, the node 103 undergoes a channel setting to serve as the terminal office of the DTP arrangement and therefore the node 103 recognizes that it is the terminal office (step 502).

Next, the terminal office 103 and the node 101 (the add/drop node in the working line) create squelch tables with regard to the working line by the conventional procedure for constructing squelch tables. As a result of creation of the squelch tables of the working line, the terminal office 103 recognizes that node 101 is the primary office (step 503).

Next, the terminal office 103 and the node 102 (the add/drop node in the protection channel) create squelch tables with regard to a protection channel by the conventional procedure for constructing squelch tables (step 504).

The terminal office 103 waits for creation of the squelch tables in the protection channel to be completed (step 505). If completion of creation of the squelch table at node 102 is recognized, the terminal office 103 judges that the node 102 is the secondary office. It should be noted that at this point in time, node 102 has not yet determined whether it is the secondary office; it can merely recognize that it is a PCA (Protection Channel Access) office.

If the terminal office 103 recognizes completion of the squelch table at node 102, it uses the squelch tables of the protection channel to report the range (nodes 103 to 101) of the node 102, which accommodates the protection channel (step 506).

By receiving the information of the working channel, the node 102 recognizes that it is the secondary office (step 507) and recognizes the node information of each office of the ring interconnection arrangement (step 508). More specifically, by receiving the range (nodes 103, 101) of the working channel, node 102 recognizes that it is the secondary office, identifies, from the range of the working channel, which node is the primary office, which is the terminal office and which is the through-office (an office that merely passes a signal), and creates an RIP (Ring Interconnection Protection) table. By using the information thus acquired, the secondary office 102 can implement a line rescue operation if a line failure occurs when rings are interconnected.

If creation of the RIP table is completed, the secondary office 102 loops back the working-channel information (nodes 103, 101) to the terminal office 103 via the protection channel using the squelch tables (step 509).

By acquiring the above-described information, the terminal office 103 recognizes completion of construction of the squelch tables of the protection channel. That is, the terminal office 103 judges that node 102 has correctly recognized that it is the secondary office. As a result, the terminal office 103 overwrites the squelch tables of the working channel with the fact that the working channel is 101~102 (step 510). The foregoing completes processing for identifying ring-connected offices in the DTP arrangement.

(E) Processing for Recognizing Secondary Office

Figure 13:
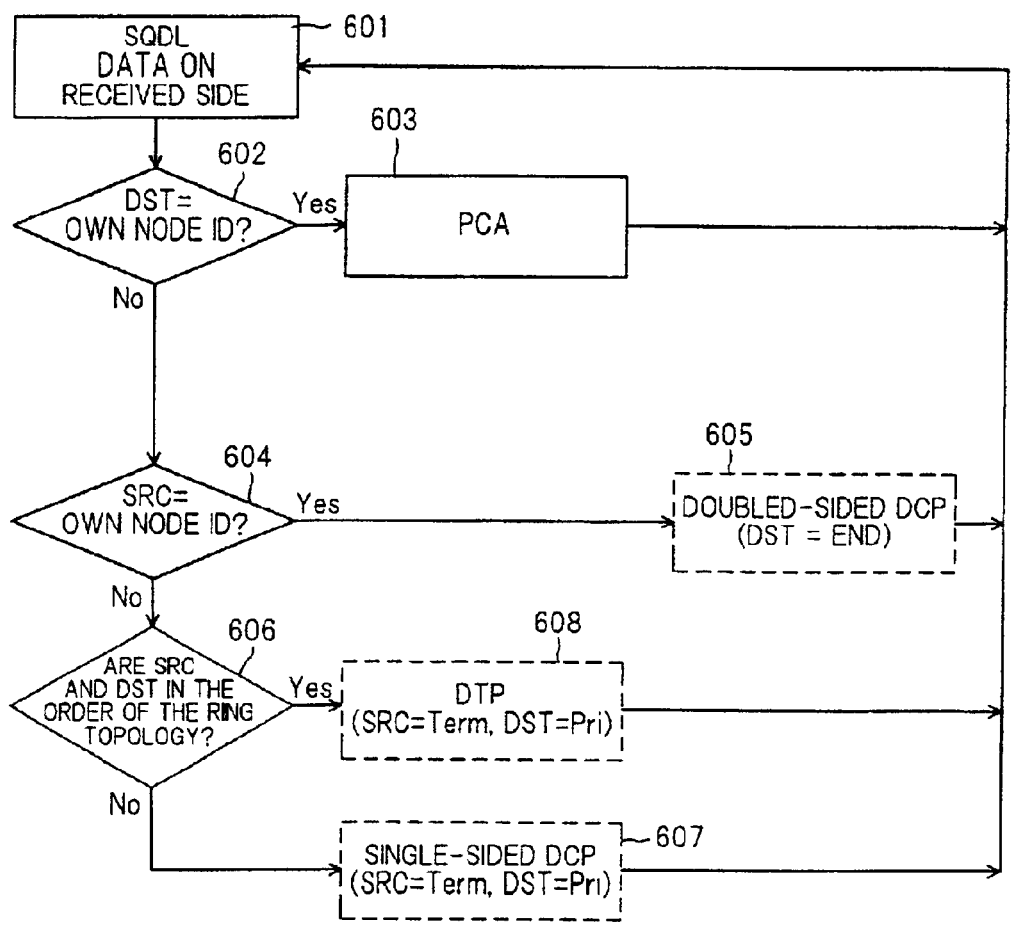
FIG. 13 is a flowchart of processing (for the incoming direction) for recognizing a secondary office.

FIG. 13 is a flowchart of processing executed at each node so that the node may recognize whether it is a secondary office. This processing flow is applicable to both the DCP and DTP arrangements. In the case of the DCP arrangement, the processing becomes that for the incoming direction, in which a signal enters the secondary office from the primary office via the protection channel. In the case of the DTP arrangement, the processing becomes that for the incoming direction, in which a signal enters the secondary office from the terminal office via the protection channel. In principle, processing in the case of the DCP arrangement will be described below.

In the processing flowchart of FIG. 13, first node (A) (FIG. 10) receives a squelch table from the primary office (C) (in the case of the DCP arrangement) (step 601). Next, node (A) checks to determine whether the node ID (=DST) in the destination field of the received squelch table matches its own node ID (step 602). If the squelch table [see the lower row at (a) of FIG. 12] is received at step 504 in FIG. 9, a match is found since DST=A holds ("YES" at step 602). Accordingly, node (A) judges that it itself is a PCA office (step 603). That is, at this stage the node (A) cannot determine that it is the secondary office; it can merely determine that it is a PCA office.

On the other hand, if at step 506 in FIG. 9 the node (A) receives a squelch table [see the middle row at (b) of FIG. 12] from the primary office (C) specifying the range (offices C, D) of the working channel, then DST in the squelch table will be C and will no longer match the node ID of node (A) ("NO" step 602). In such case, node (A) checks to determine whether the node ID (=SRC) in the source field of the received squelch table matches its own node ID (step 604). If a match is found, node (A) judges that it itself is a secondary office of a double-sided DCP arrangement and that it is a DST=END node (add/drop node) in the squelch table (step 605).

If a match is not found, node (A) checks to determine whether SRC, DST in the squelch table are arrayed in the array sequence of the ring topology (step 606).

If the counter-clockwise direction in FIG. 10 is assumed to be the array direction of the ring topology, then the sequence of the topology array is A→B→C→D→E→F. Further, SRC, DST in the squelch table become SRC=D, DST=C. The sequence of SRC and DST in the squelch table therefore is D→C, which differs from the array sequence C→D of the ring topology. As a consequence, node (A) judges that it is of the DCP arrangement and judges that SRC=D=terminal office, DST=C=primary office hold (step 607).

In the case of the DTP arrangement, on the other hand, the positions of the terminal office and primary office are interchanged, as evident from FIGS. 7A, 7B, and therefore the sequence of the topology array is A→B→D→C→E→F. Since the sequence of SRC and DST is D→C, this agrees with the sequence D→C of the ring-topology array. Accordingly, if SRC, DST are arrayed in the array sequence of the ring topology ("YES" at step 606), then node (A) judges that it is of the DTP arrangement and judges that SRC=terminal office, DST=primary office hold (step 608).

Figure 14:
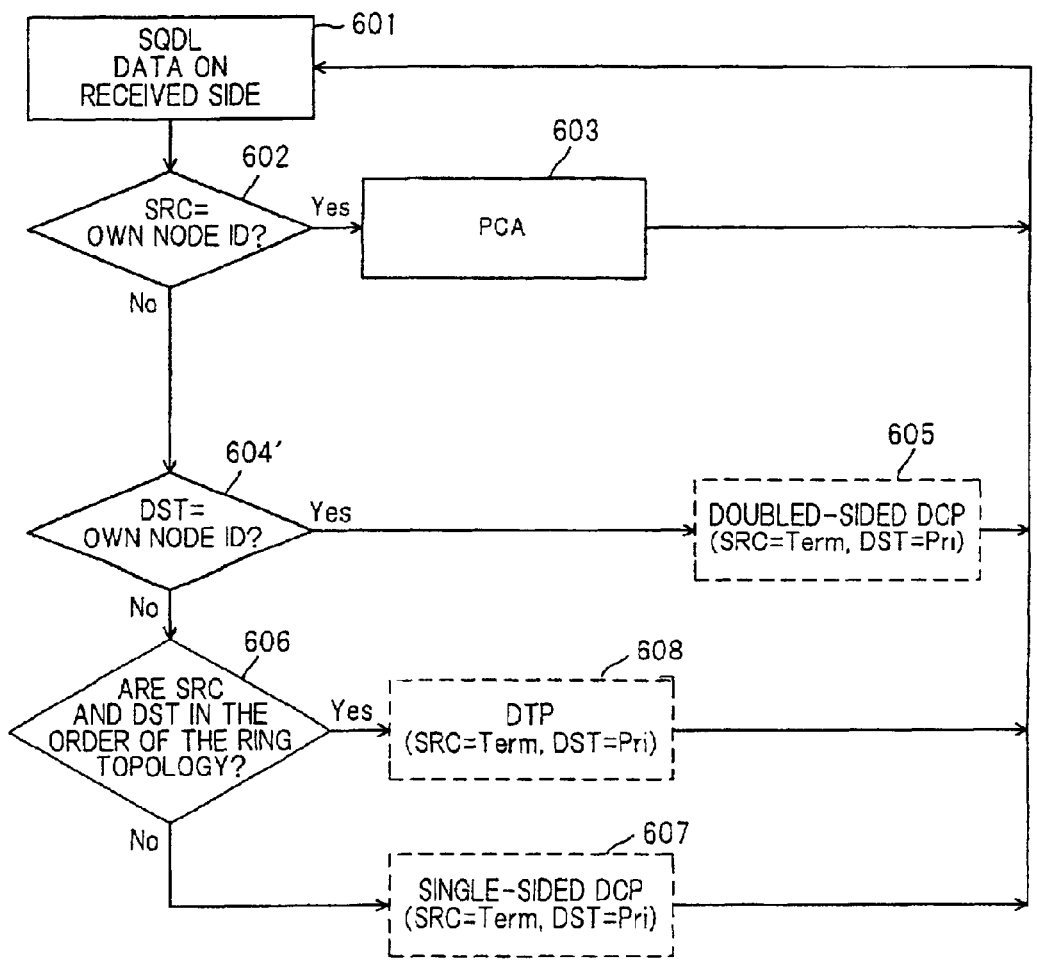
FIG. 14 is a flowchart of processing (for the outgoing direction) for recognizing a secondary office.

FIG. 14 is another flowchart of processing executed at each node so that the node may recognize whether it is the secondary office. This is a flowchart of processing for the outgoing direction. The difference between this processing at that of FIG. 13 is that DST and SRC are interchanged.

(F) Embodiment of Double-Sided DCP Arrangement

Figure 15:
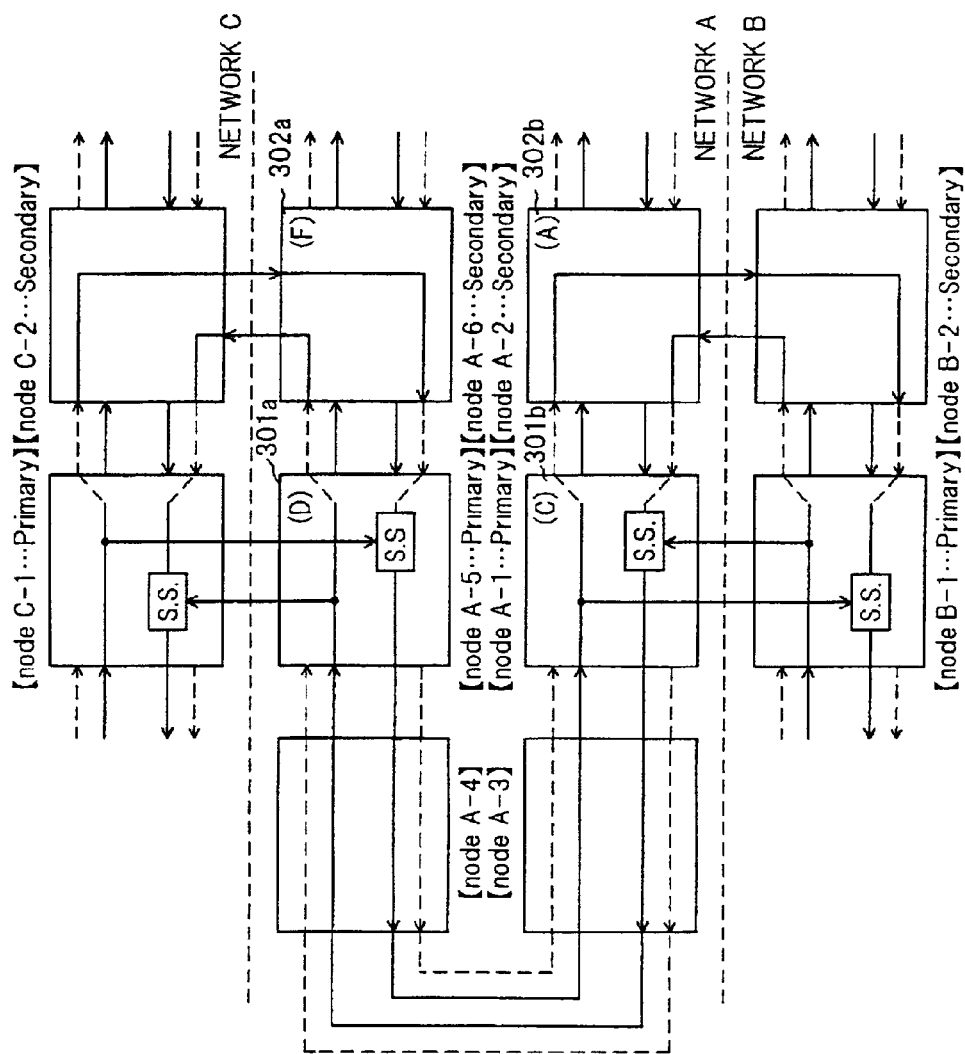
FIG. 15 is a diagram of an arrangement in which three ring networks are connected.

The foregoing relates to an example in which two BLSR networks are connected. However, an arrangement in which three BLSR networks A, B and C are connected also is possible, as shown in FIG. 15 (this is referred to as a "double-sided DCP arrangement"). In the double-sided DCP arrangement, a ring interconnection is implemented between the networks B and C, the network A interposed between the networks B and C does not terminate (drop/add) the line but is used only to join the networks B and C.

Each node in the networks B and C recognizes whether it is a primary office, secondary office, terminal office or through-office by the control described above, and the secondary office executes a path switching operation conforming to the point of failure. The intermediate network A is merely used to join the networks B and C.

Figure 16:
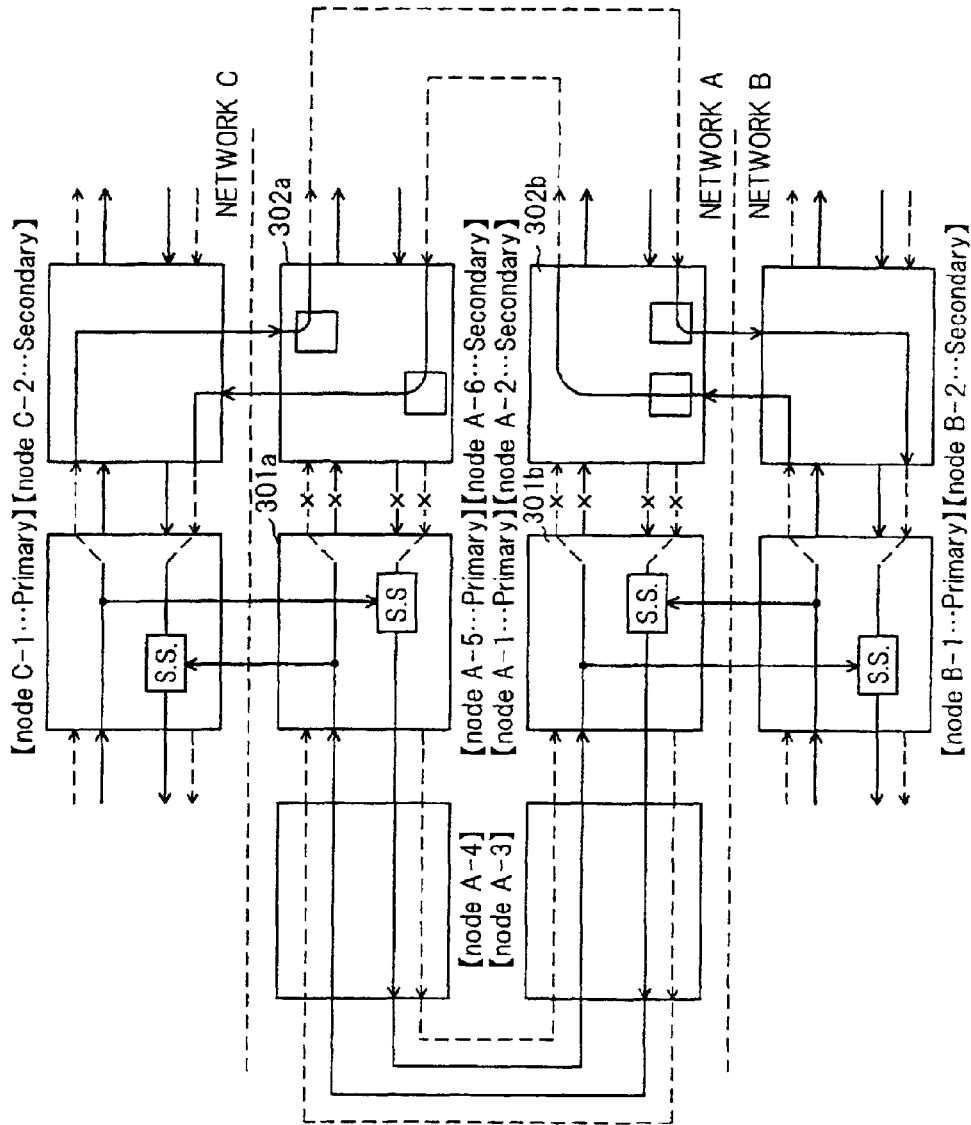
FIG. 16 is a diagram useful in describing signal paths when a failure occurs.

However, when a dual failure in the protection channel occurs at the locations indicated by the x marks in FIG. 16, it is required that secondary offices 302*a*, 302*b* of the intermediate network A execute a path switching operation as indicated by the dashed lines in FIG. 16, and that they implement a special line-rescue operation for maintaining the new signal path between the networks B and C. In order for the secondary offices 302a, 302b of the intermediate network A to carry out this line-rescue operation, it is required that they recognize not only information of the primary office and terminal office on the same side as their own side but also information of the primary office and terminal office of the opposite side.

More specifically, it is required that the secondary office 302a, which is the ring-connected office between the networks A and C, recognize the secondary office 302b and primary office 301b, which are the ring-connected offices between the networks A and B. Conversely, it is required that the secondary office 302b, which is the ring-connected office between the networks A and C, recognize the secondary office 302a and primary office 301a, which are the ring-connected offices between the networks A and B.

In the double-sided DCP arrangement, a drop/add office does not exist in the intermediate network. As a consequence, a node that performs the function of a terminal office in the single-sided DCP arrangement does not exist, and a node serving as the primary office performs the roles of both the terminal office and primary office.

Thus, it is required that each node of the intermediate network identify whether it is a primary office or a secondary office. Moreover, it is required that the secondary office identify which node is the primary office of one DCP arrangement, and which nodes are the secondary office and primary office of the other DCP arrangement.

Figure 17:
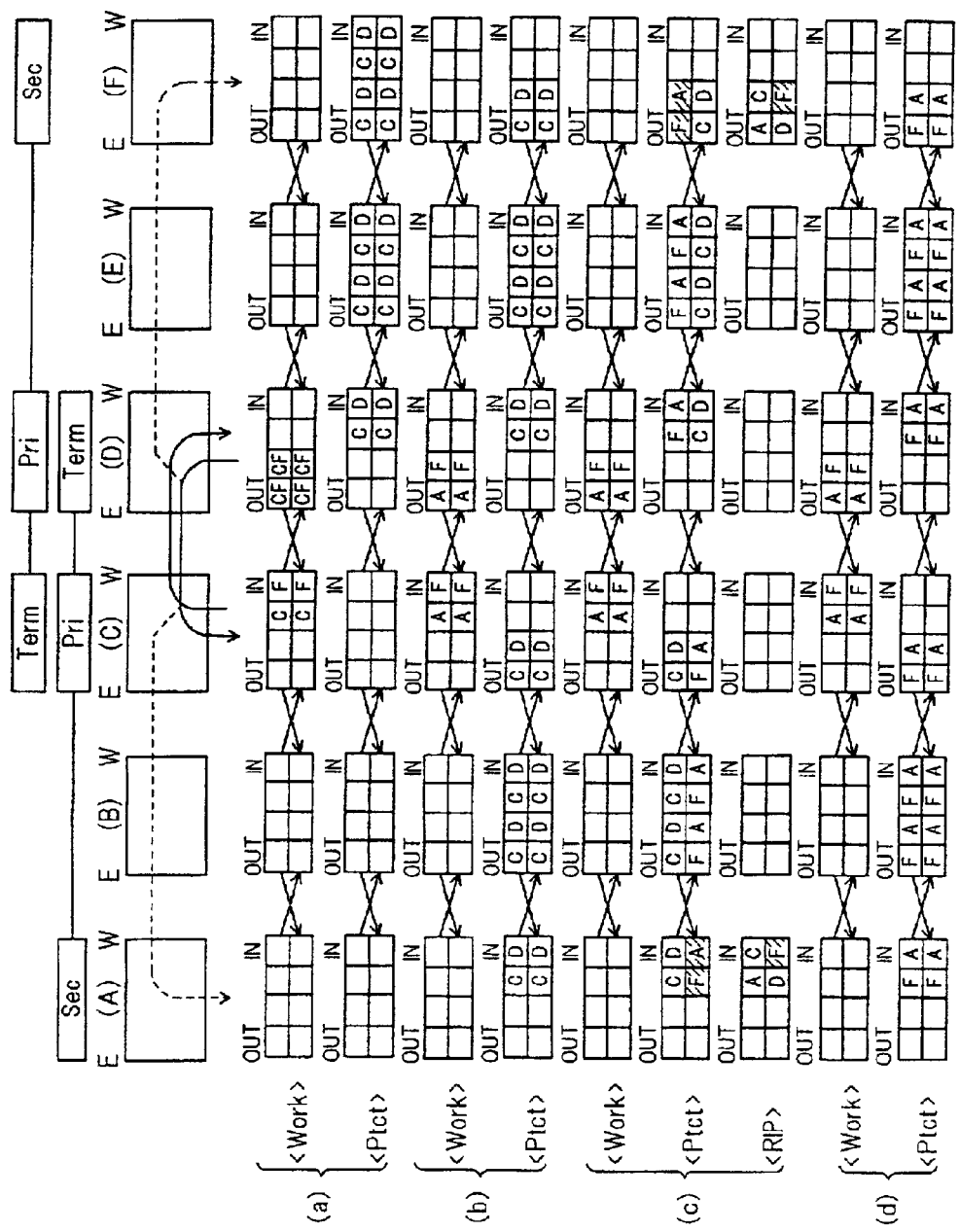
FIG. 17 is a diagram useful in describing office identification according to the present invention when three ring networks are connected.
Figure 18A:
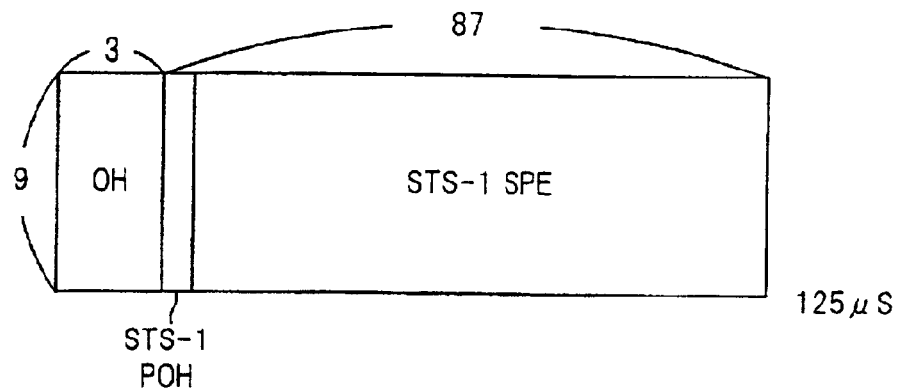
FIGS. 18A and 18B are diagrams useful in describing an STA-1 frame format and K1, K2 bytes according to the prior art.
Figure 18B:
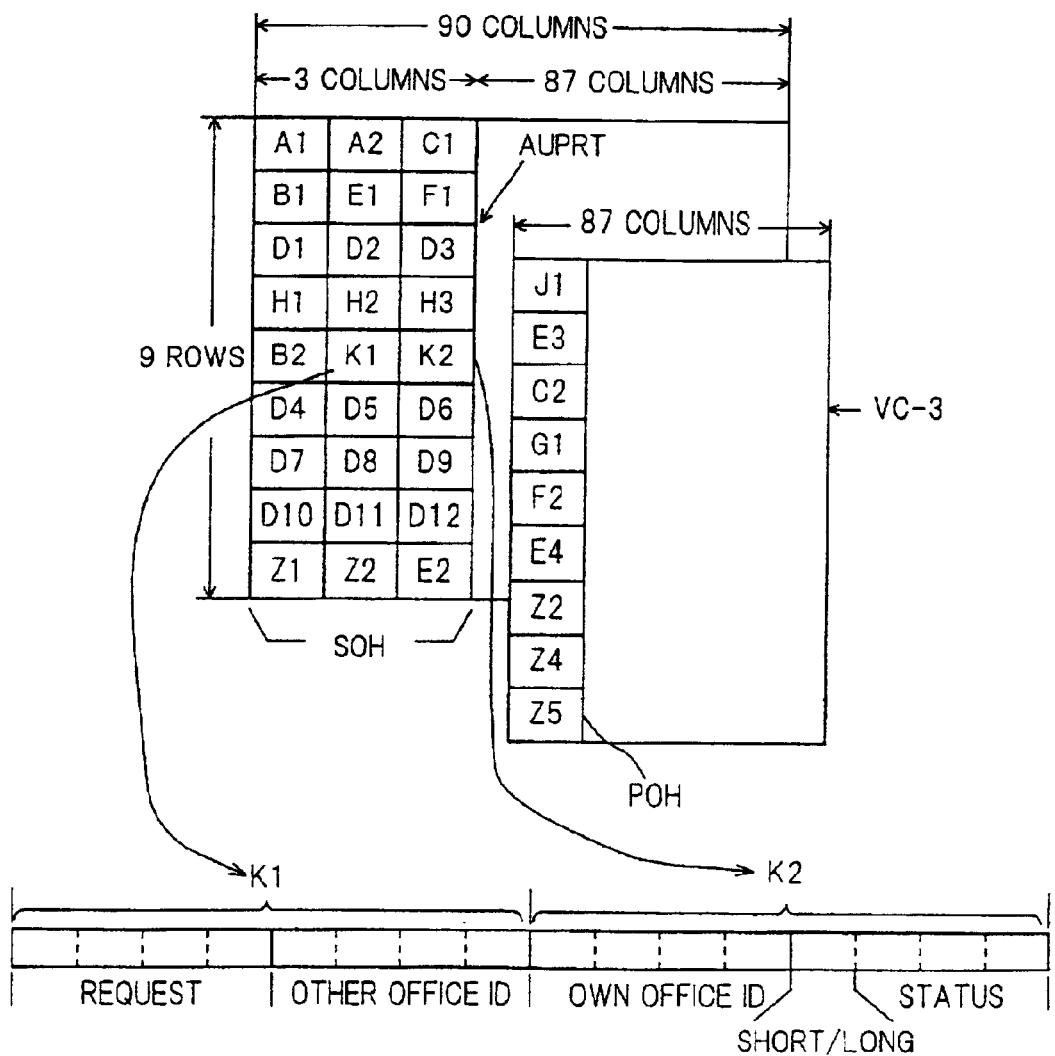
Figure 19:
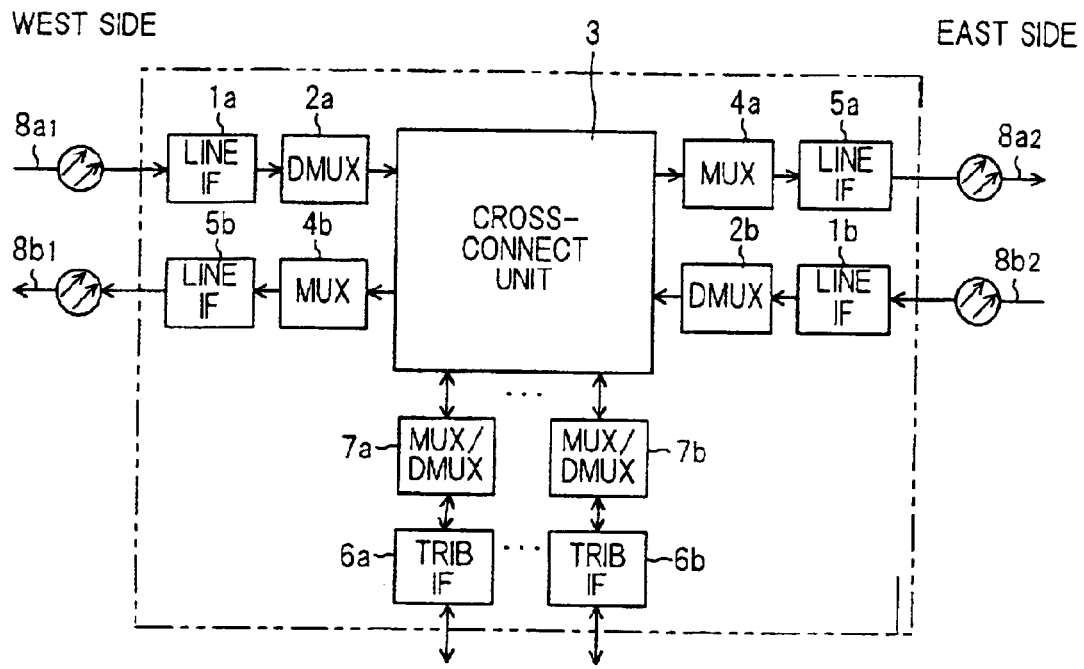
FIG. 19 is a simplified block diagram of an ADM transmitting apparatus according to the prior art.
Figure 20:
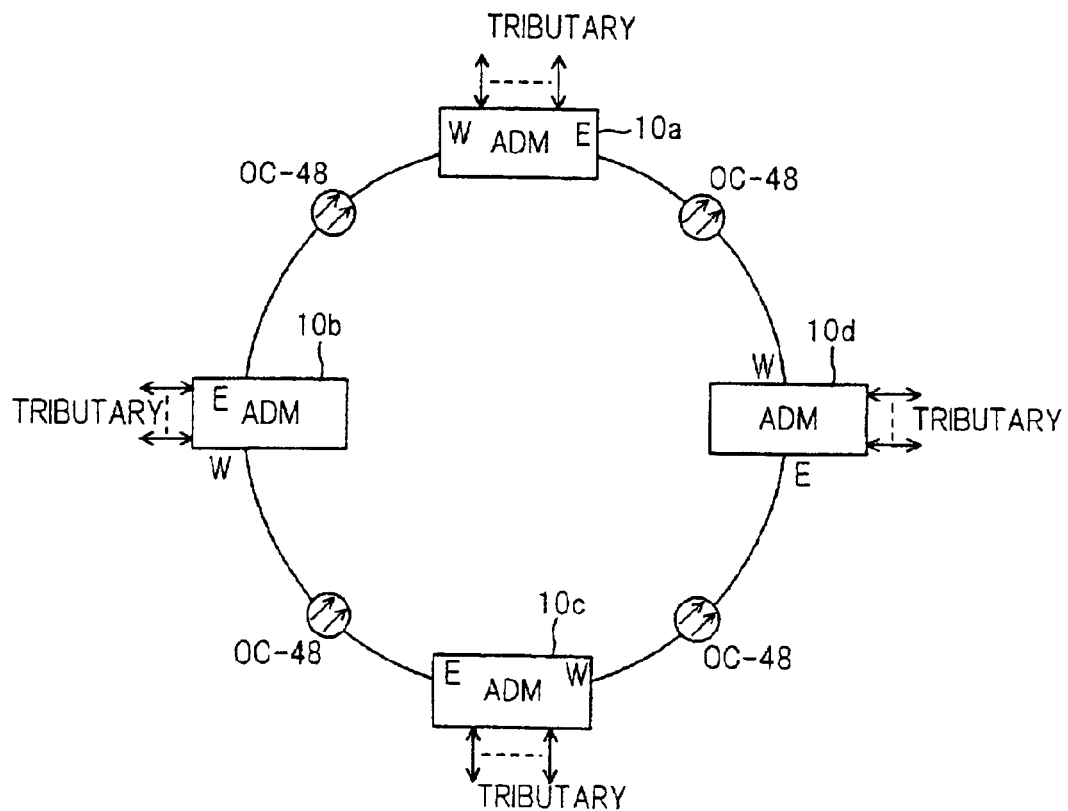
FIG. 20 is a diagram showing a ring structure according to the prior art.
Figure 21:
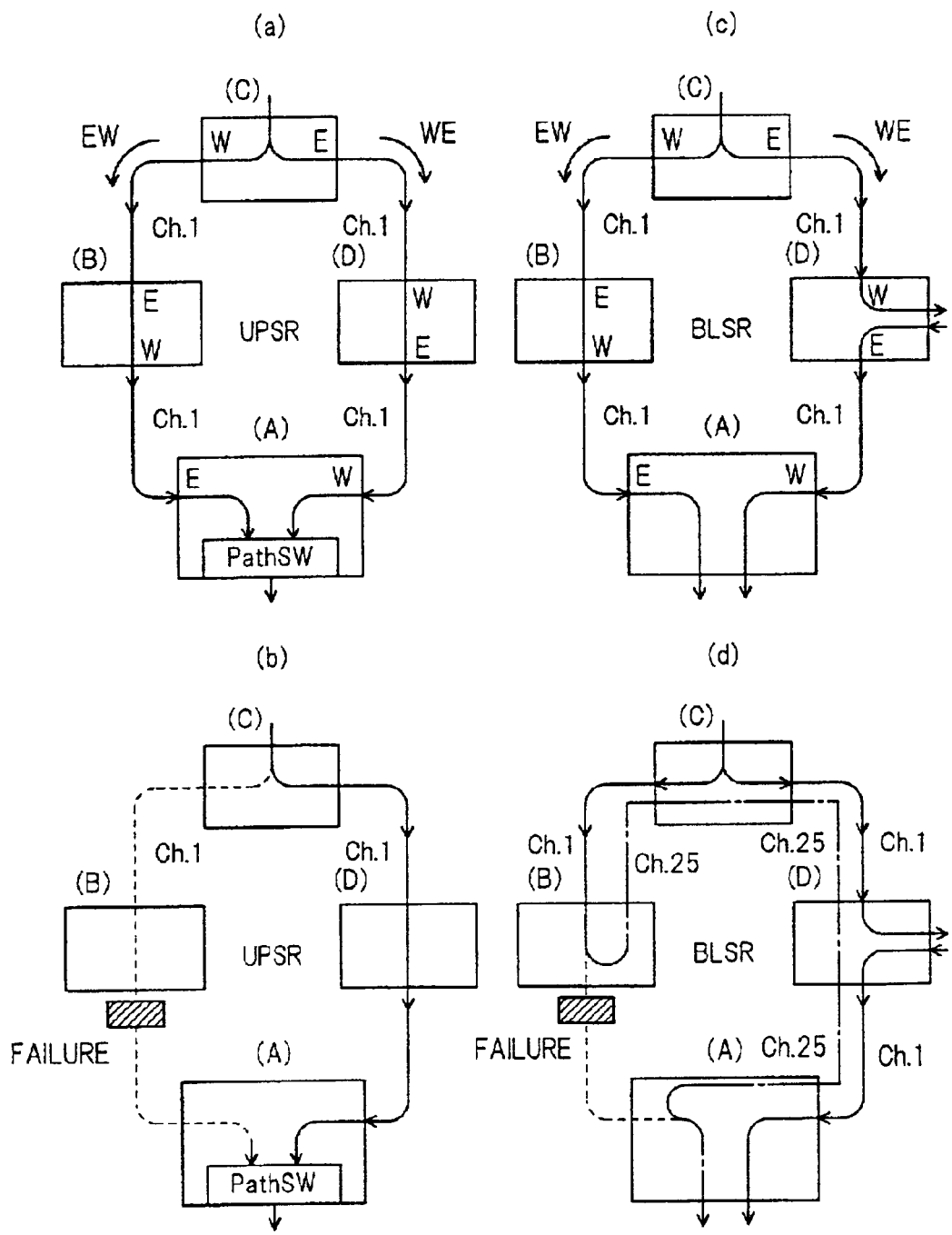
FIG. 21 is a diagram useful in describing rescue in the event of a failure according to the prior art.
Figure 22:
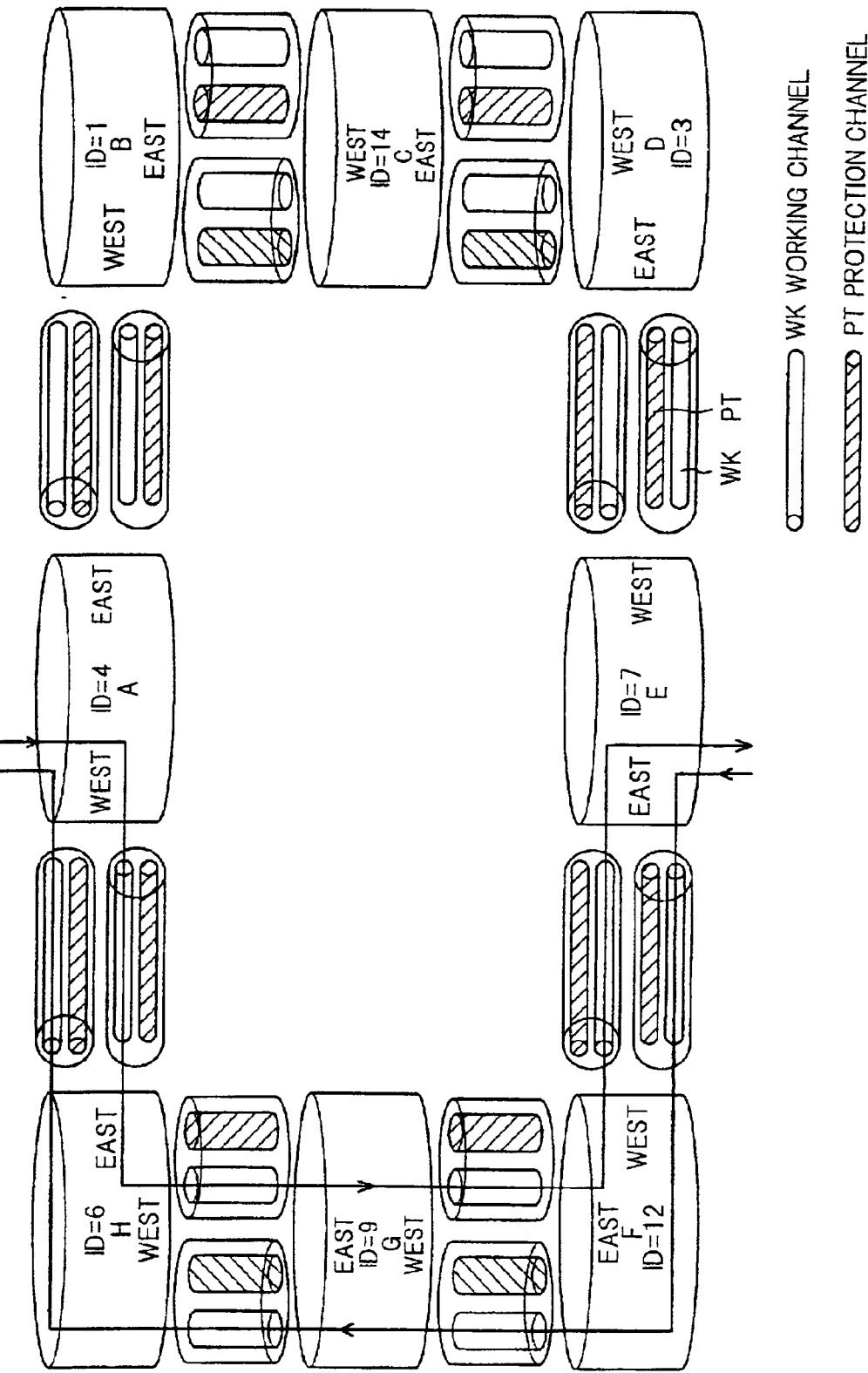
FIG. 22 is a first diagram useful in describing an APS protocol according to the prior art.
Figure 23:
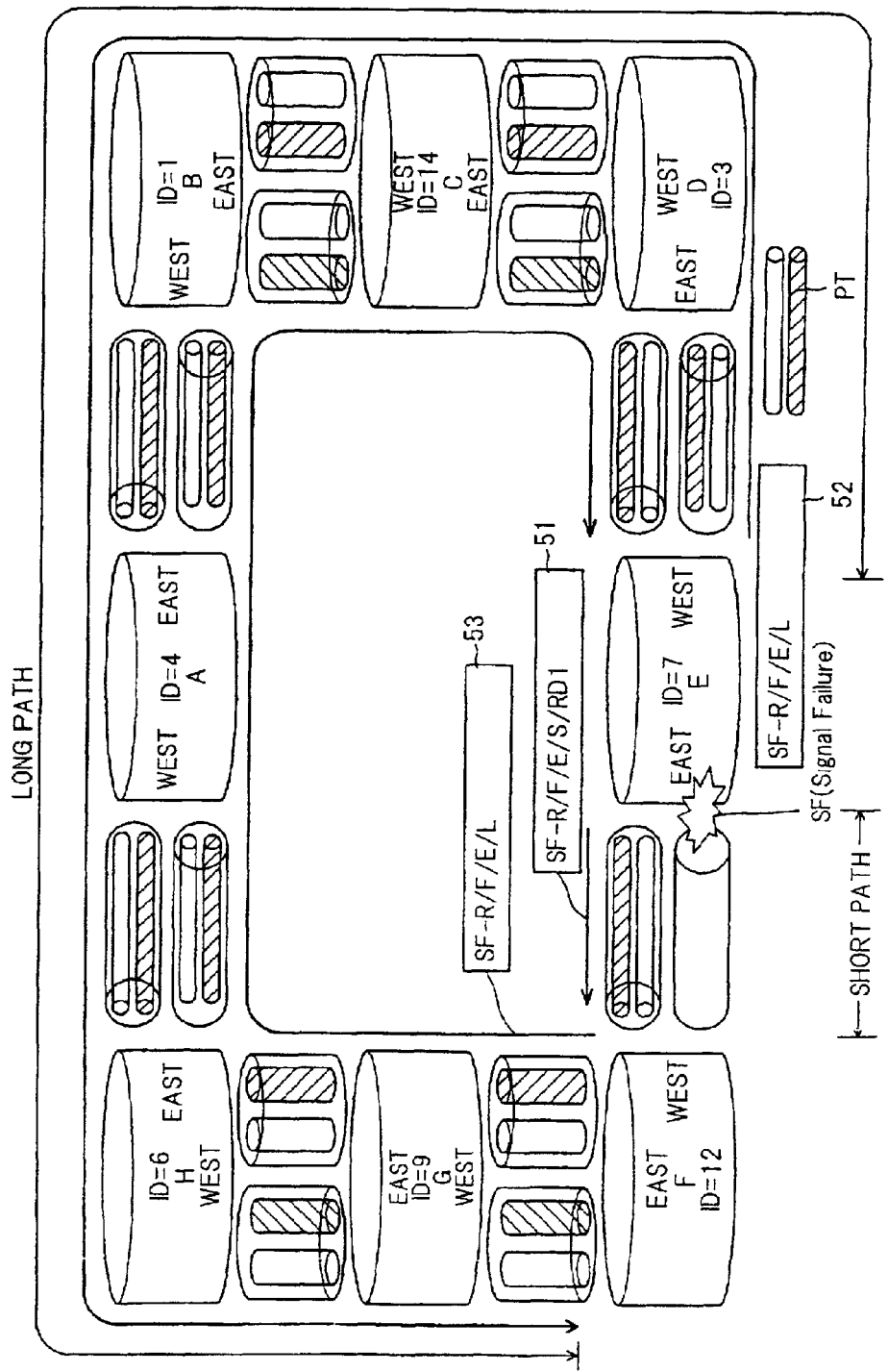
FIG. 23 is a second diagram useful in describing an APS protocol according to the prior art.
Figure 24:
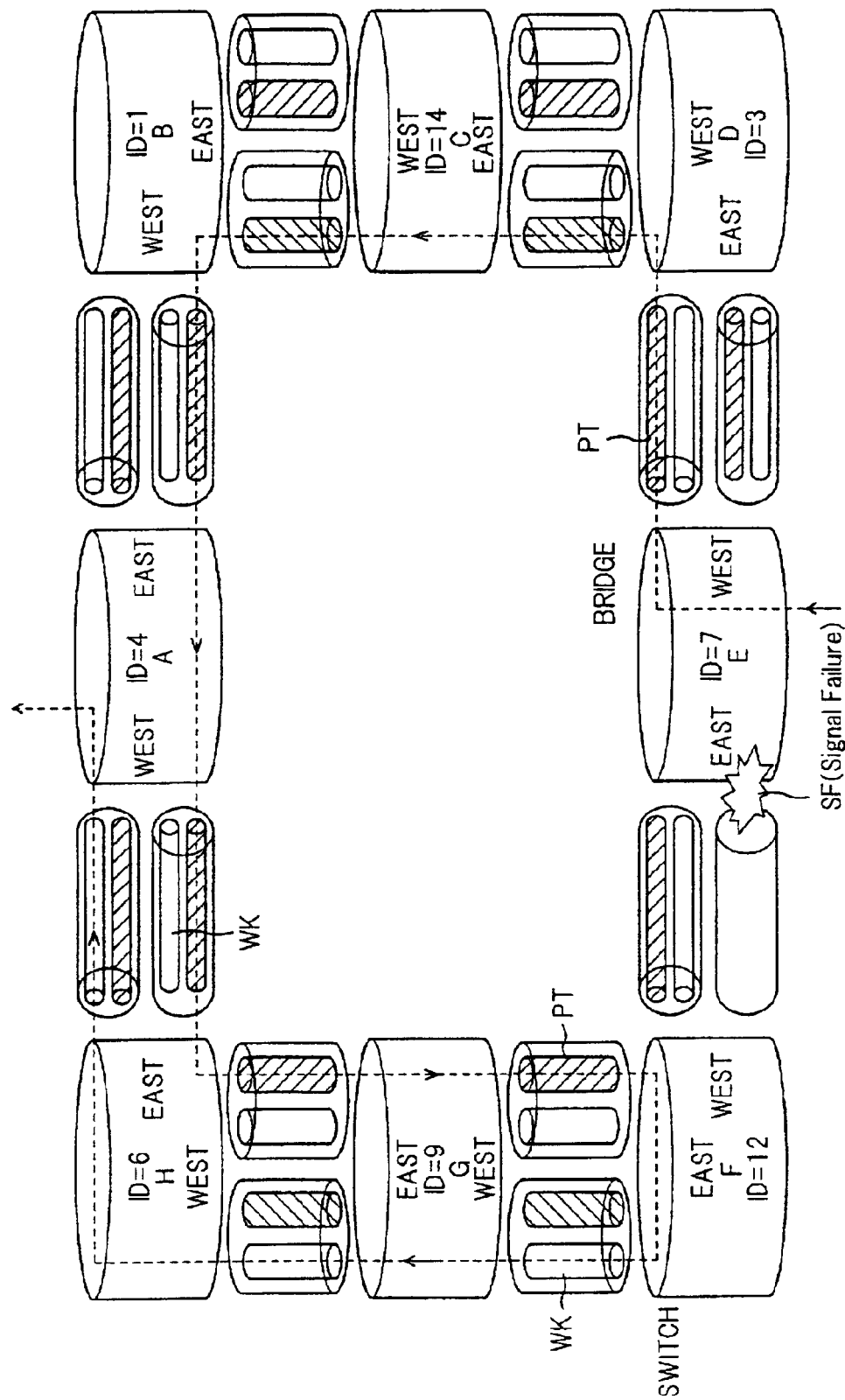
FIG. 24 is a third diagram useful in describing an APS protocol according to the prior art.
Figure 25:
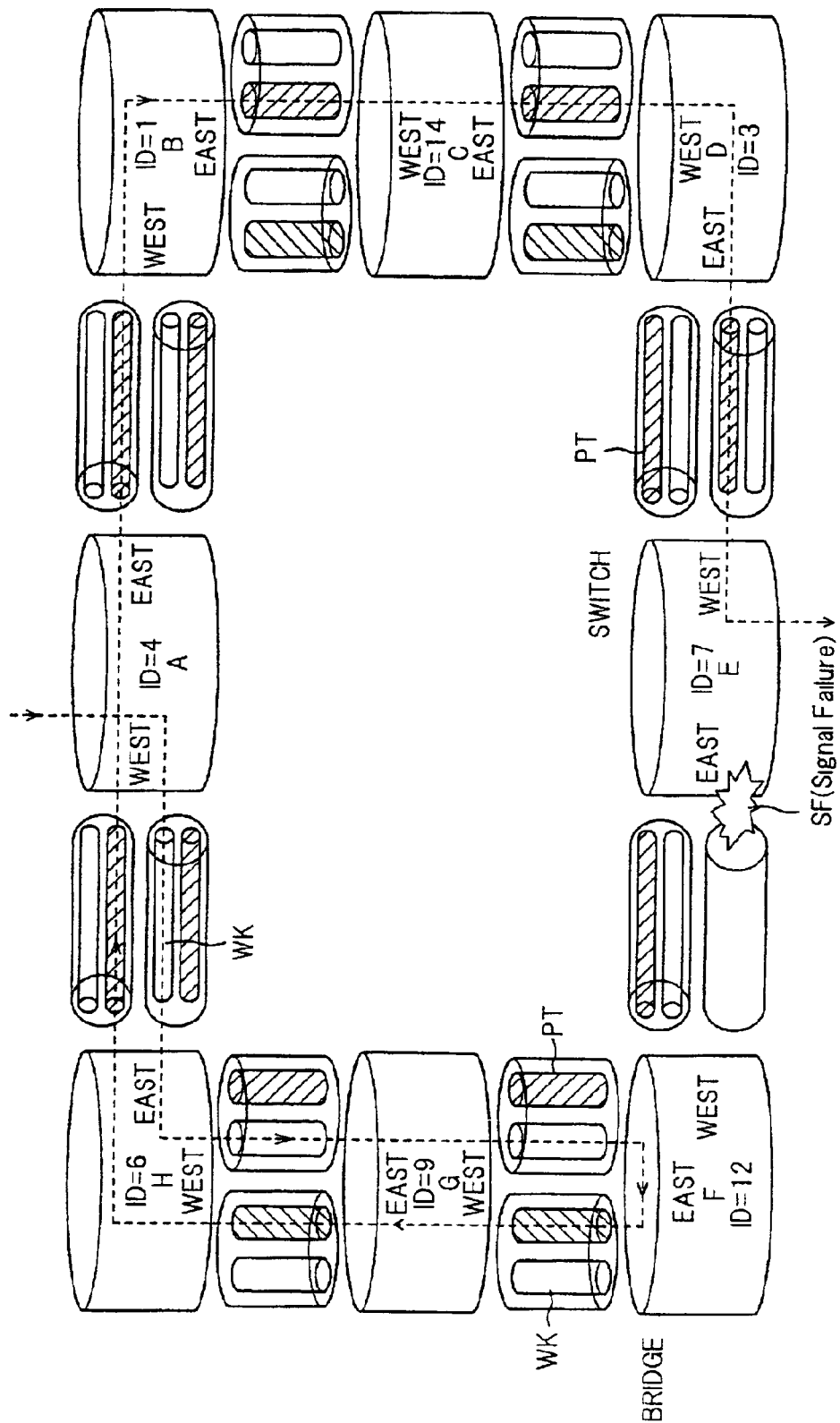
FIG. 25 is a fourth diagram useful in describing an APS protocol according to the prior art.
Figures 26A, 26B:
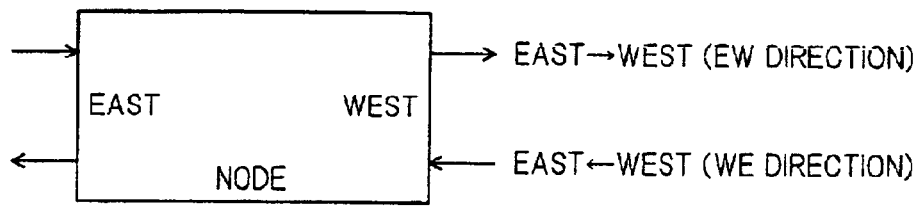
FIGS. 26A and 26B are diagrams useful in describing a squelch table according to the prior art.
Figure 27:
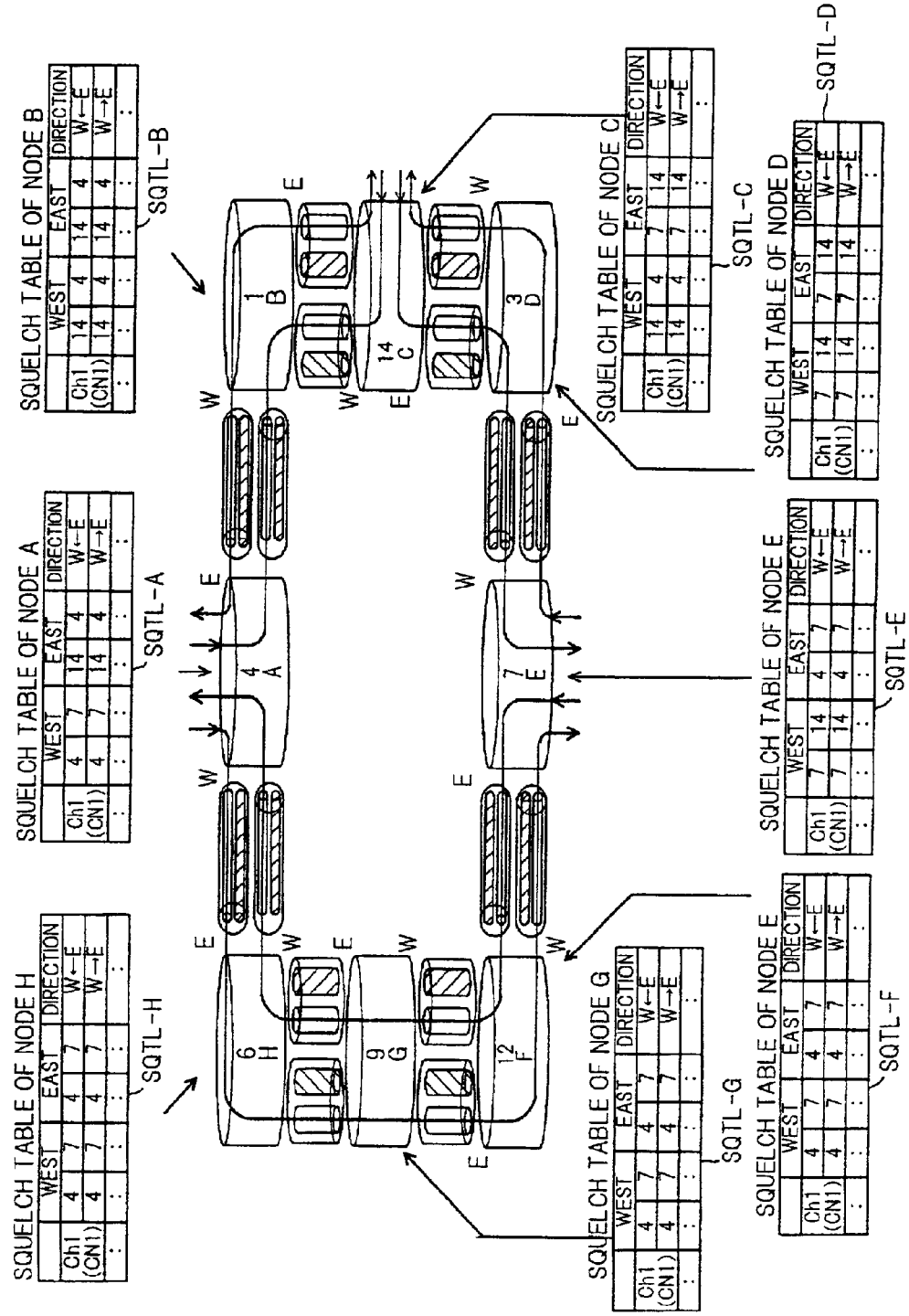
FIG. 27 is a diagram useful in describing squelch tables of respective nodes in a ring network according to the prior art.
Figure 28:
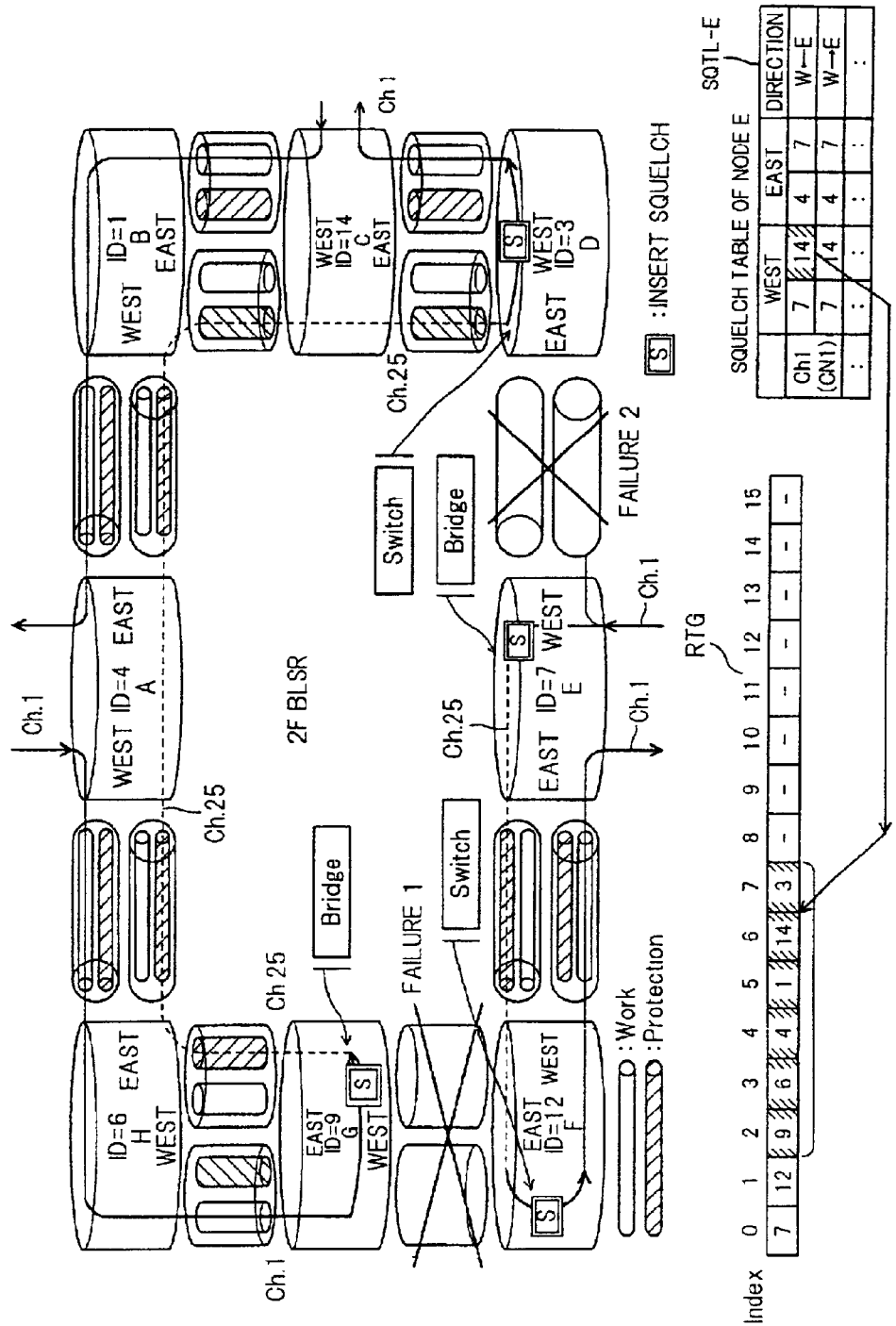
FIG. 28 is a diagram useful in describing processing for deciding squelch in the event of a failure according to the prior art.
Figure 29A:
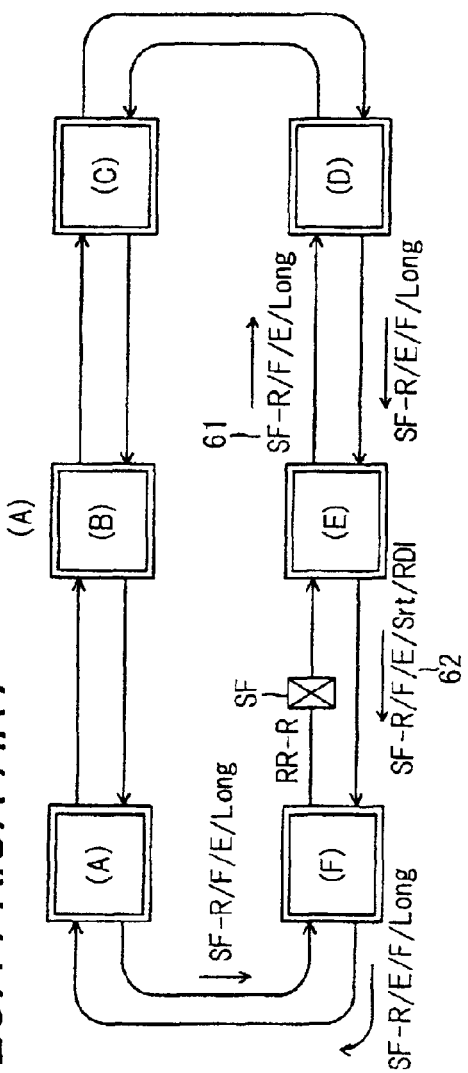
FIGS. 29A and 29B are diagrams useful in describing decisions regarding single failure and multiple failures according to the prior art.
Figure 29B:
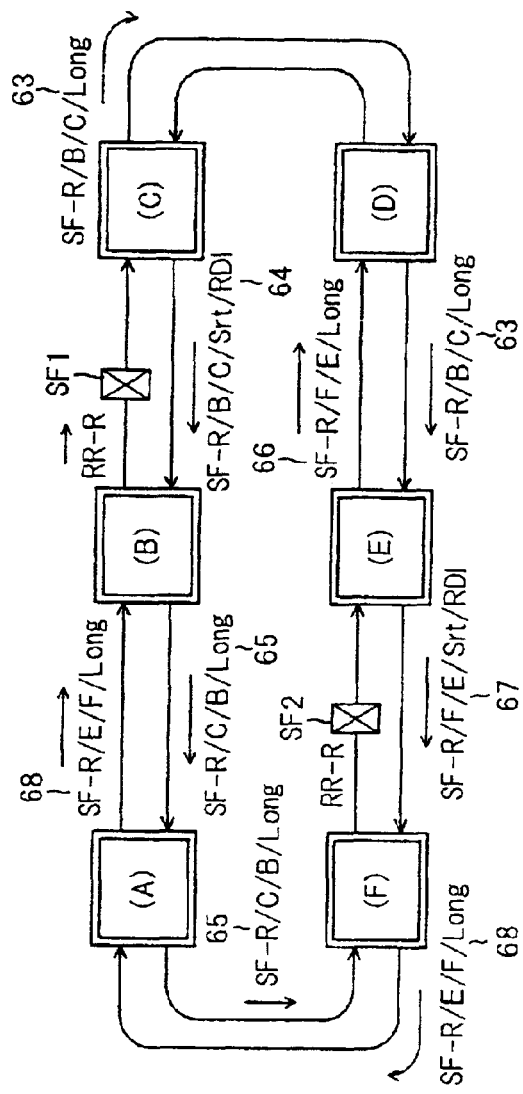
Figure 30A:
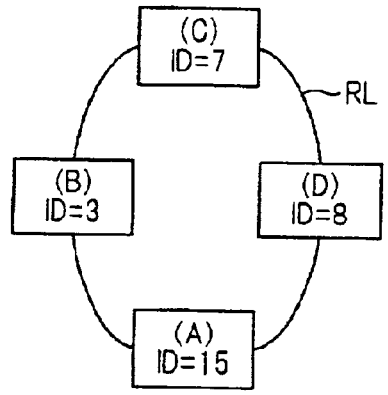
FIGS. 30A, 30B and 30C are diagrams useful in describing the construction of a ring topology according to the prior art.
Figure 30B:
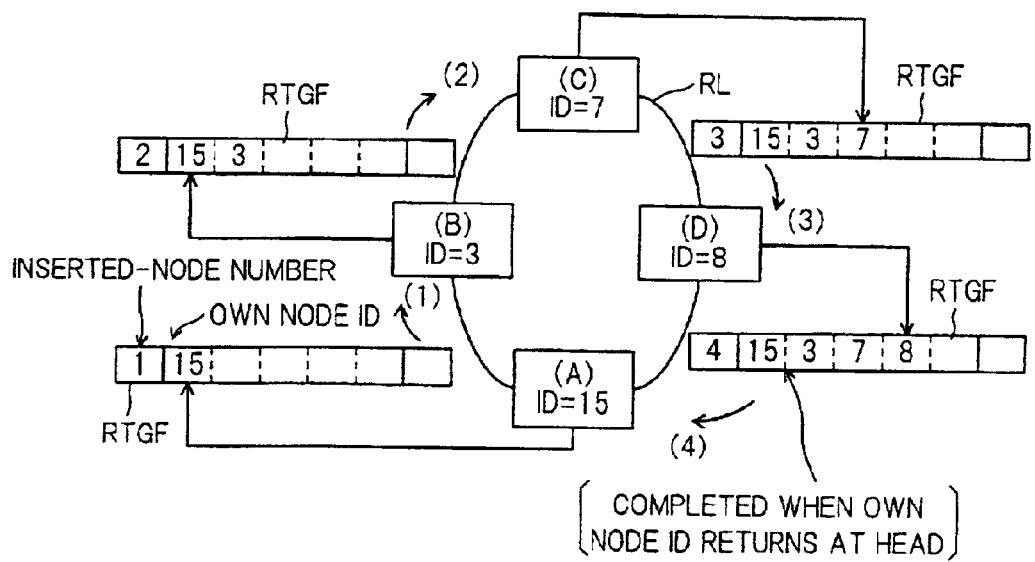
Figure 30C:
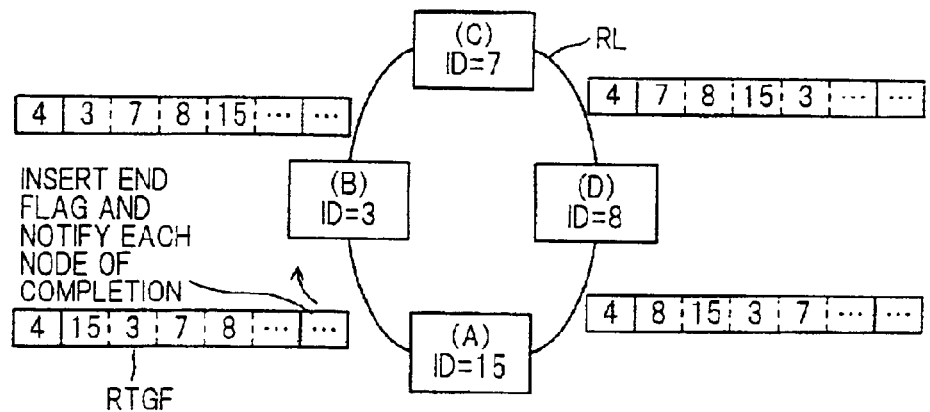
Figure 31:
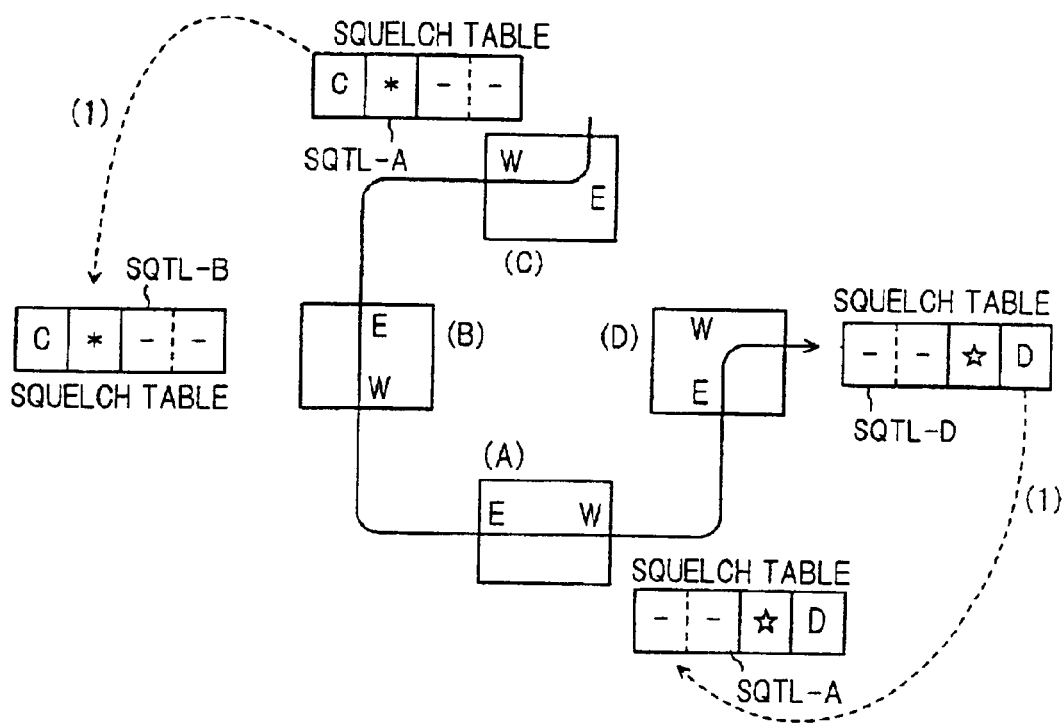
FIG. 31 is a first diagram useful in describing formation of squelch tables according to the prior art.
Figure 32:
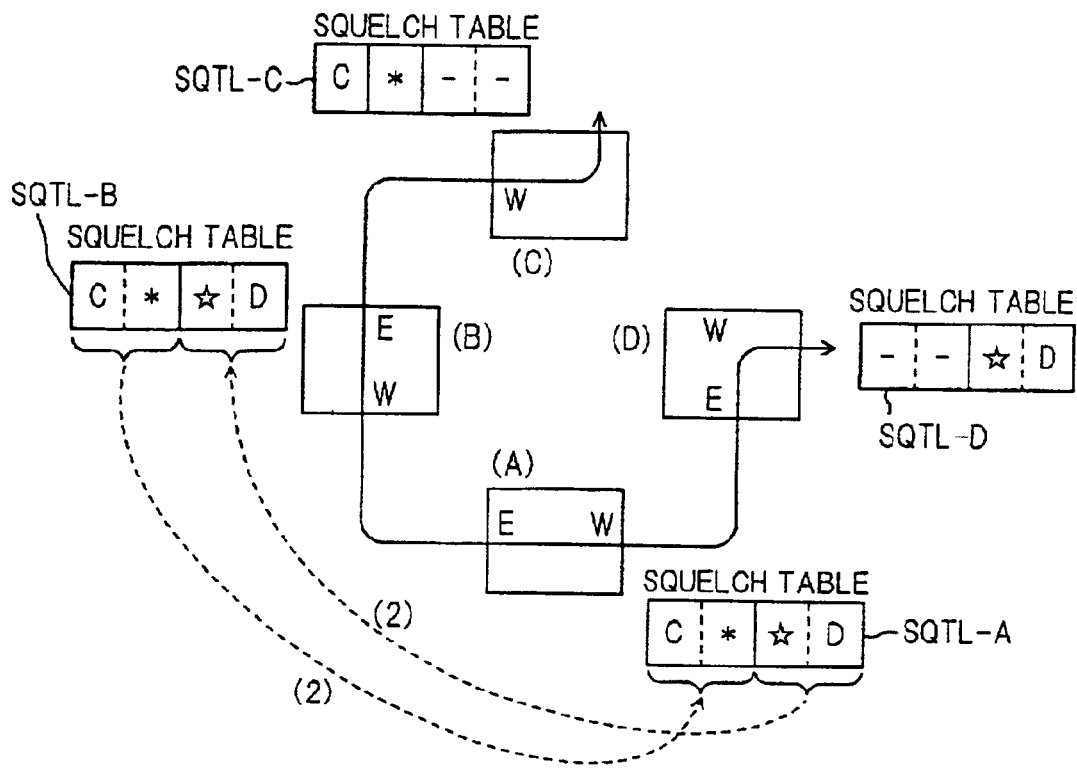
FIG. 32 is a second diagram useful in describing formation of squelch tables according to the prior art.
Figure 33:
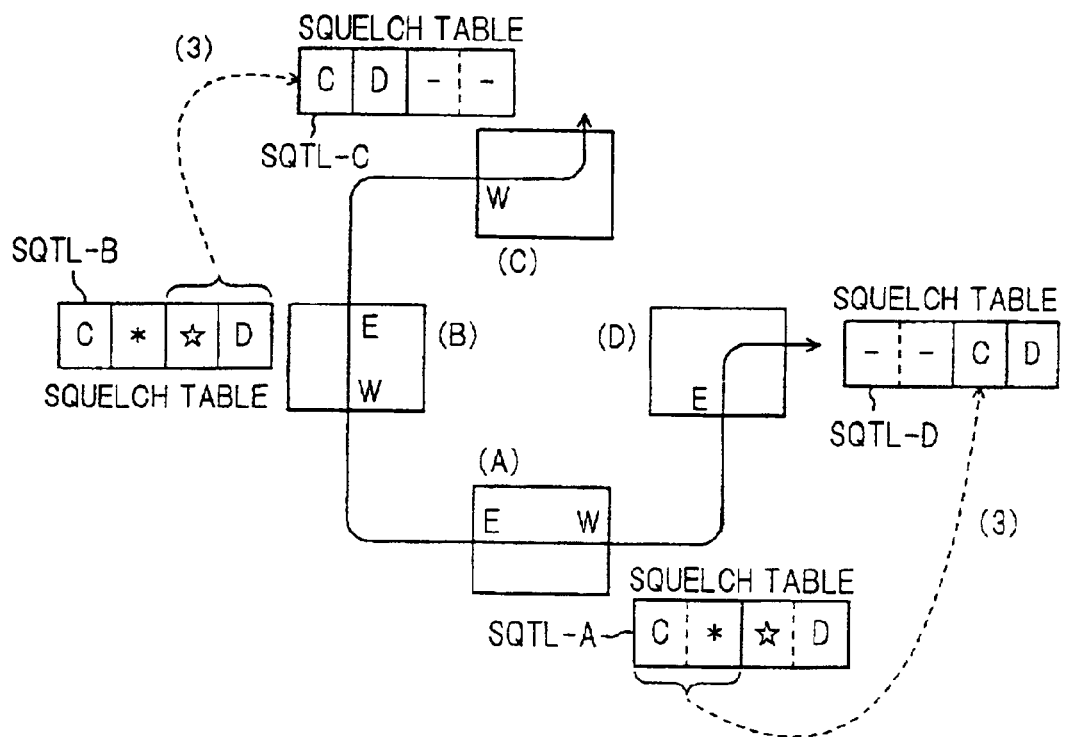
FIG. 33 is a third diagram useful in describing formation of squelch tables according to the prior art.
Figure 34:
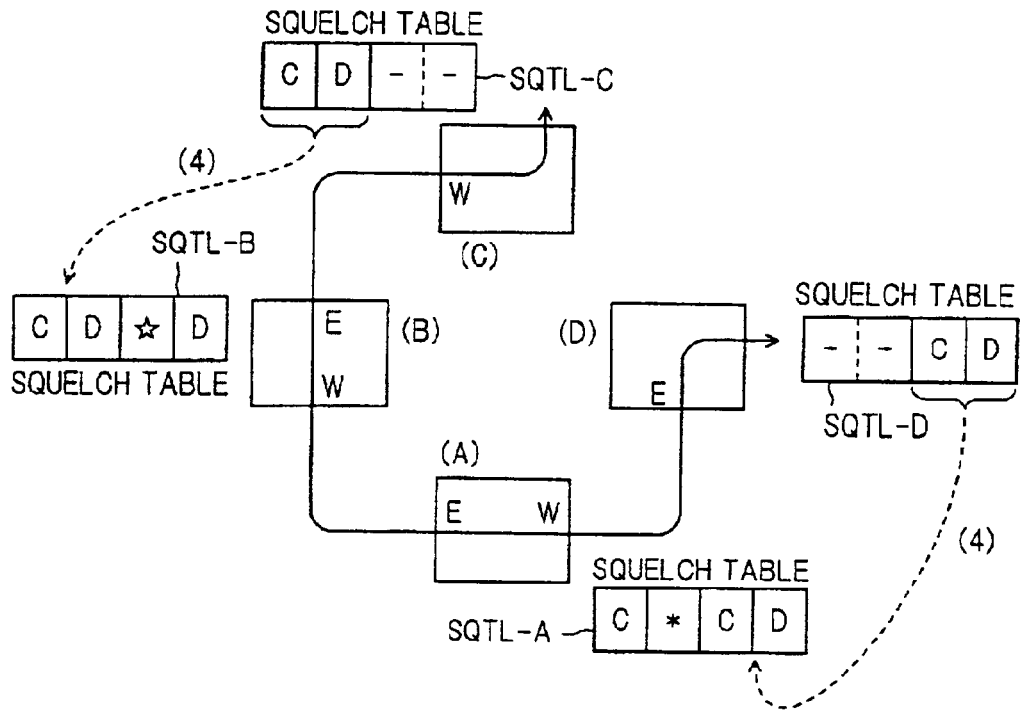
FIG. 34 is a fourth diagram useful in describing formation of squelch tables according to the prior art.
Figure 35:
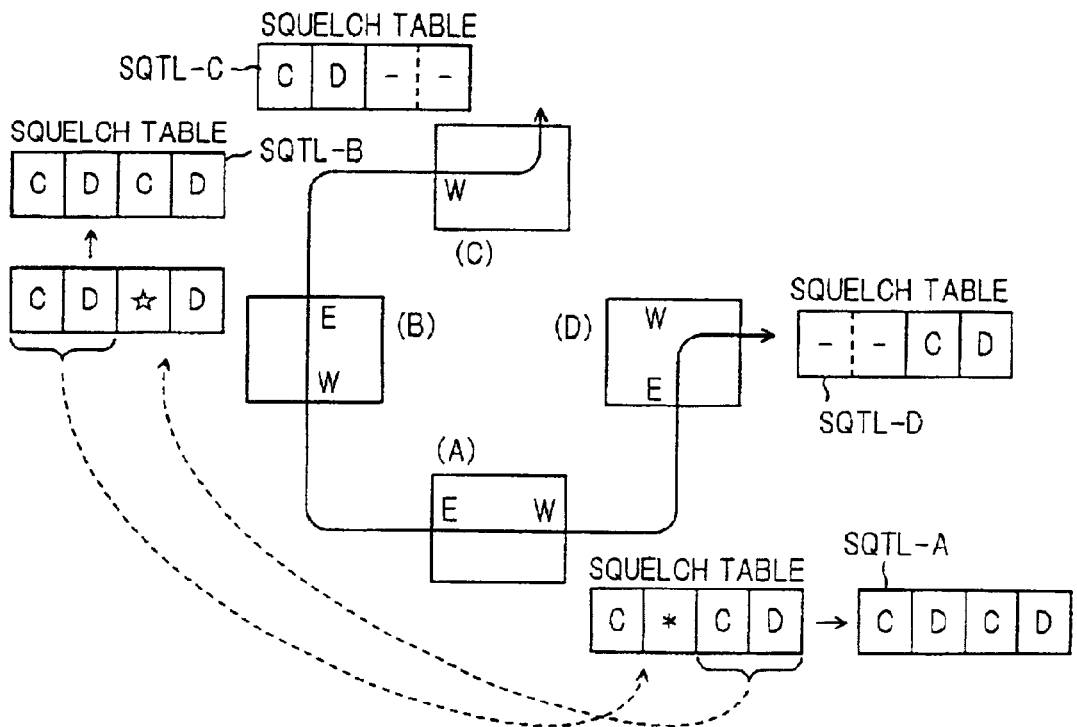
FIG. 35 is a fifth diagram useful in describing formation of squelch tables according to the prior art.
Figure 36A:
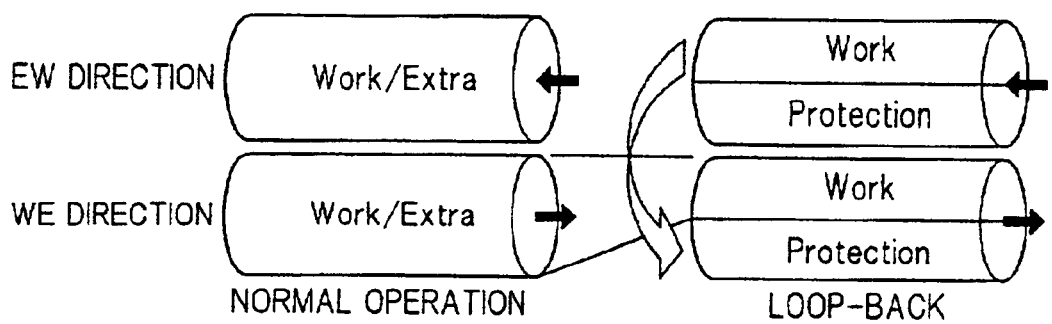
FIGS. 36A and 36B are diagrams useful in describing 2-fiber and 4-fiber BLSR schemes according to the prior art.
Figure 36B:
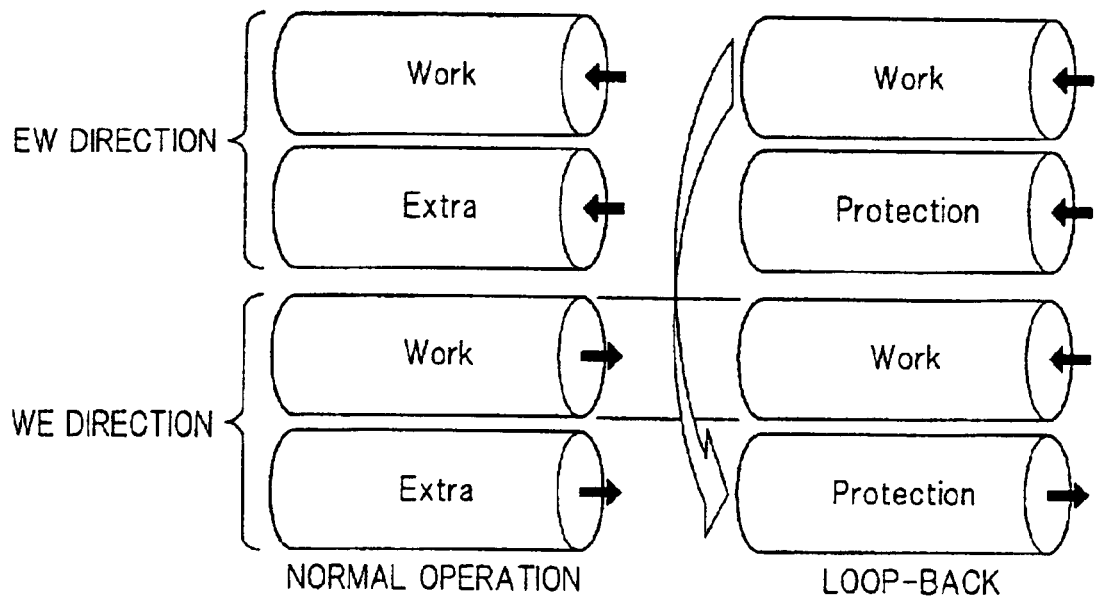
Figure 37:
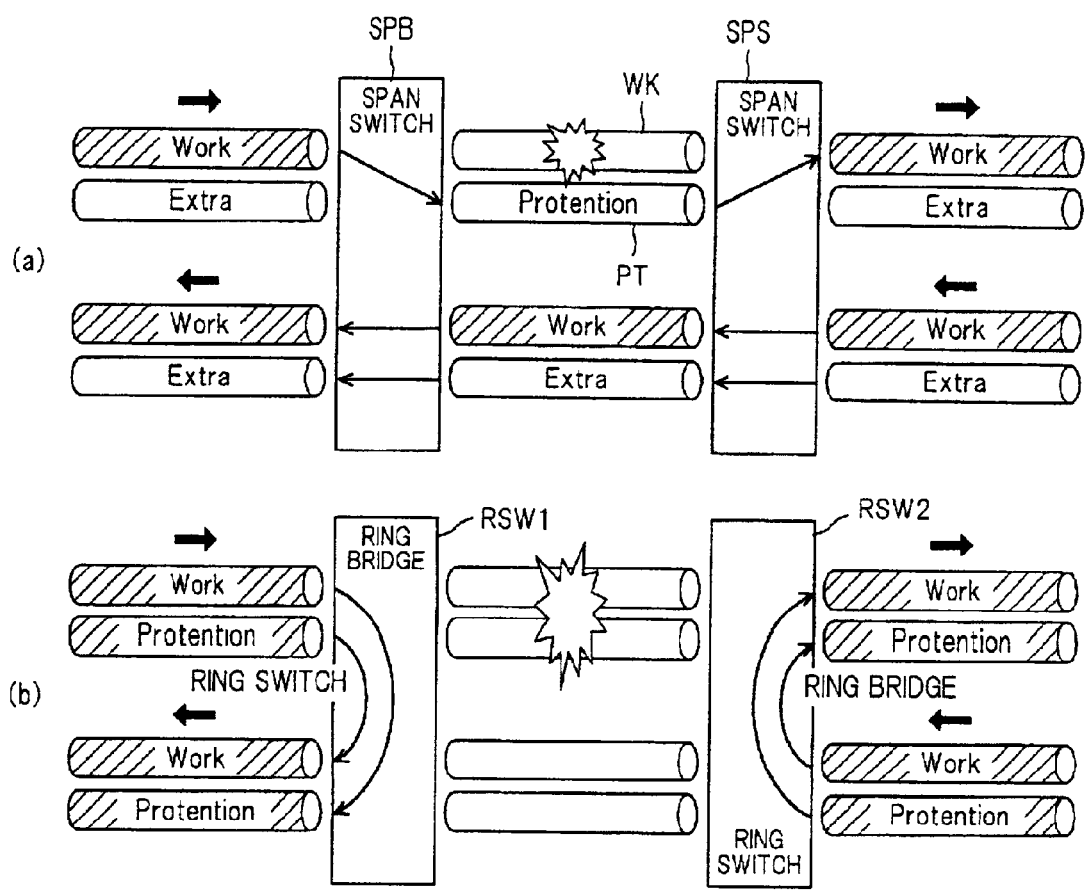
FIG. 37 is a diagram useful in describing span switching according to the prior art.
Figure 38:
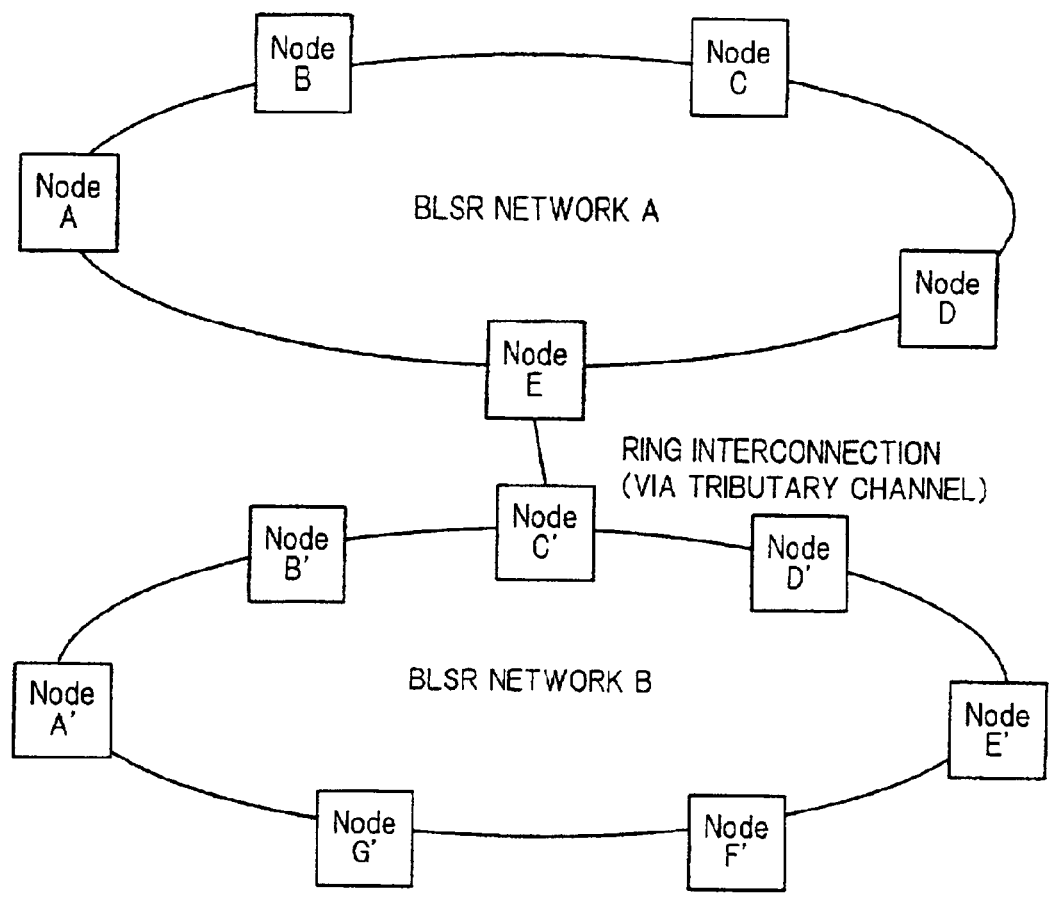
FIG. 38 is a diagram useful in describing a first ring connection according to the prior art.
Figure 39:
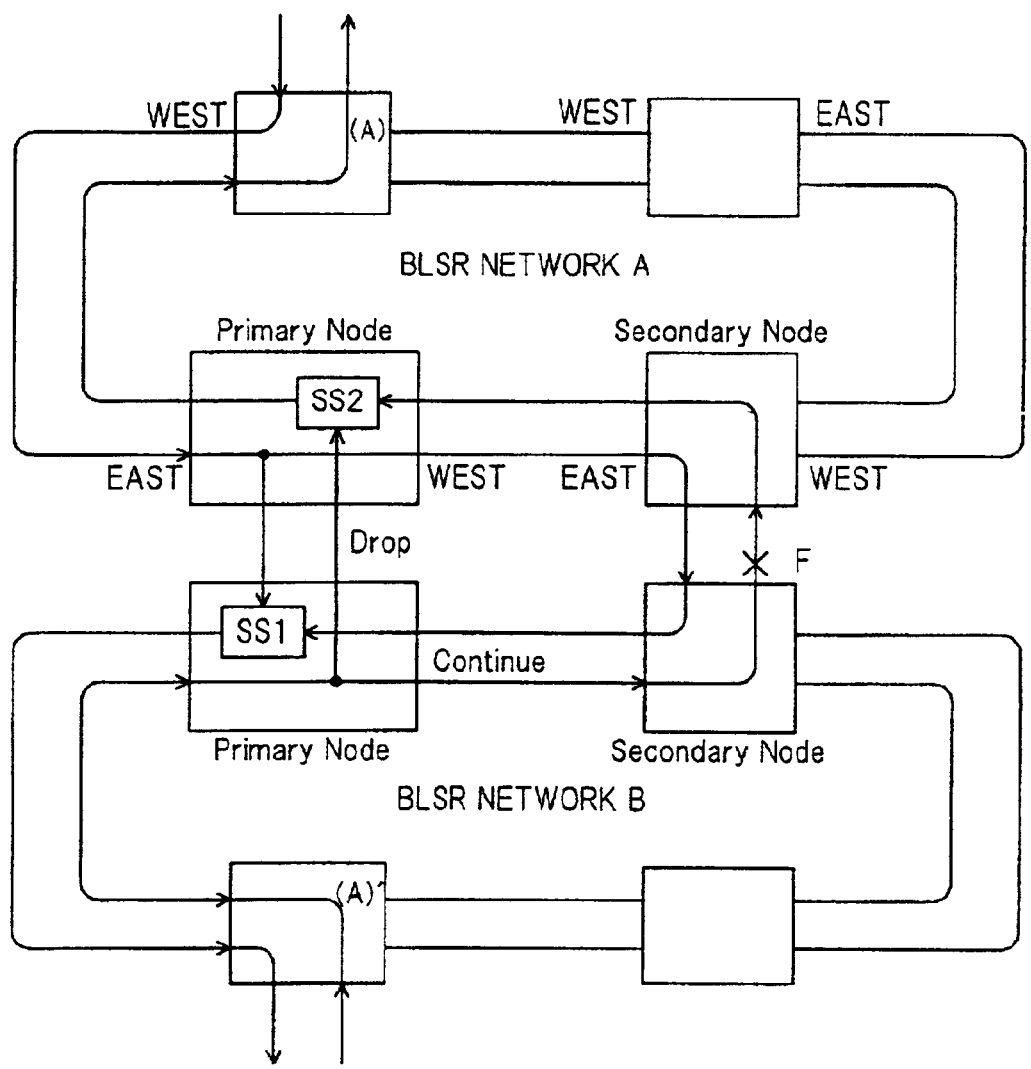
FIG. 39 is a diagram useful in describing service selectors.
Figure 40:
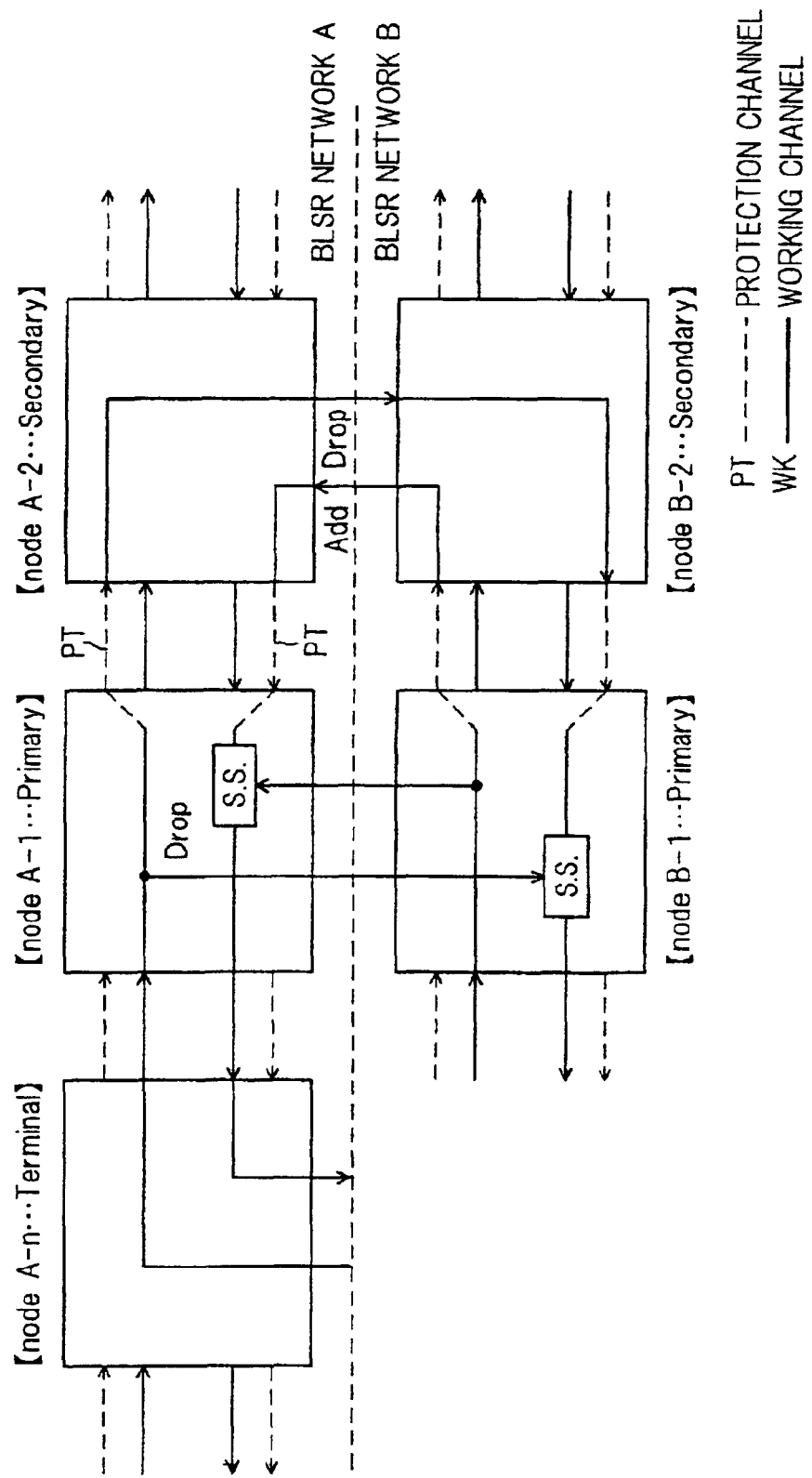
FIG. 40 is a diagram showing the structure of a ring connection recommended by the ITU-U according to the prior art.

FIG. 17 is a diagram useful in describing processing for identifying ring-connected offices.

Nodes (C), (A) and (D) constructing a first DCP identify ring-connected offices by executing the processing of FIG. 9 in a manner similar to that of the case for the single-sided DCP. That is, node (C) recognizes that it is a primary office constructing the first DCP, node (A) recognizes that it is a secondary office constructing the first DCP, and node (D) recognizes that it is a terminal office constructing the first DCP. Further, the primary office (C) and terminal office (D) rewrite their own squelch tables in such a manner that nodes (A) and (D) will become add/drop nodes of the working channel [see (c) in FIG. 12)].

Similarly, nodes (D), (F) and (C) constructing a second DCP identify ring-connected offices by executing the processing of FIG. 9 in a manner similar to that of the case for the single-sided DCP. That is, node (D) recognizes that it is a primary office constructing the second DCP, node (F) recognizes that it is a secondary office constructing the second DCP, and node (C) recognizes that it is a terminal office constructing the second DCP. Further, the primary office (D) and terminal office (C) rewrite their own squelch tables in such a manner that nodes (F) and (C) will become add/drop nodes of the working channel [see (a) in FIG. 17)].

Next, if the squelch tables of the first and second DCPs are combined, the squelch tables of the working and protection channels of each node become as shown at (b) in FIG. 17.

Under these conditions, the primary office (C) of the first DCP reports the range (offices A, F) of the working channel to the secondary office (A) using the squelch tables of the protection channel. Further, the primary office (D) of the second DCP reports the range (offices F, A) of the working channel to the secondary office (F) using the squelch tables of the protection channel.

If the secondary office (A) receives a squelch table specifying the range (office A~office F) of the working channel, the secondary office (A) checks to determine whether the SRT node (source node) in the squelch table [see the middle row at (c) of FIG. 17) matches its own node ID. If the SRC node (=A) matches its own node ID (=A), the node (A) judges that it is a double-sided DCP arrangement, recognizes that the node (F) is a secondary office of the second DCP arrangement and creates an RIP table [see the lower row at (c) in FIG. 17]. Similarly, if the secondary office (F) receives a squelch table specifying the range (office F~office A) of the working channel, the secondary office (F) checks to determine whether the SRT node in the squelch table [see the middle row at (c) of FIG. 17) matches its own node ID. If the SRC node (=F) matches its own node ID (=F), the node (F) judges that it is a double-sided DCP arrangement, recognizes that the node (A) is a secondary office of the first DCP arrangement and creates an RIP table [see the lower row at (c) in FIG. 17].

If creation of the RIP table is completed, the secondary office (A) loops back the working-channel information (office A~office F) to the primary office (C) via the protection channel using the squelch tables. Similarly, the secondary office (F) loops back the working-channel information (office A~office A) to the primary office (D) via the protection channel using the squelch tables.

By acquiring the above-described information, the primary offices (C), (D) terminate processing for identifying ring-connected offices of the doubled-sided DCP arrangement.

If the secondary office of the intermediate network A thenceforth detects the failures shown in FIG. 16, then this office switches the path to the route indicated by dashed lines.

Thus, in accordance with the present invention, each node can recognize which office it is as well as which offices other nodes are automatically. In the event of a failure, therefore, each node is capable of continuing communication between rings using a switching method specific to ring interconnection, and it can be arranged so that communication can be carried out through a PCA line between offices in a ring connection.

Further, in accordance with the present invention, each node is capable of recognizing which office it is as well as which offices other nodes are in DCP and DTP arrangements and can continue communication between rings even if a failure occurs.

Further, the present invention is such that even in an arrangement connecting three ring networks, each node can perform office identification and can perform a path switching operation that conforms to a failure, thereby making it possible to continue communication between rings even in the event of a failure.

Further, in accordance with the present invention, identification of a network-forming office can be performed without interfering with the conventional procedure for constructing squelch tables, and it can be so arranged that there will be no drastic change in the content of squelch-table information in a conventional BLSR network.

As many apparently widely different embodiments of the present invention can be made without departing from the spirit and scope thereof, it is to be understood that the invention is not limited to the specific embodiments thereof except as defined in the appended claims.

What is claimed is:

1. A method of recognizing offices of a ring network having first and second network connecting offices for connecting ring networks together and for dropping a signal from a terminal office, comprising the steps of:

recognizing at each node of the ring network, based upon channel setting information, which office the node is;

executing a procedure, which is for creating squelch tables of working and protection channels based upon the channel setting information, between a first node, which has been recognized as being the first network connecting office or the terminal office, and other nodes;

identifying a second node, which is the second network connecting office, at the first node by the procedure for creating a squelch table of the protection channel;

sending office identification information, upon embedding this information in the squelch table of the protection channel, from the first node to the second node; and recognizing, at the second node, that this node is the second network connecting office based upon the office identification information.

2. The method according to claim 1, further comprising a step of constructing a ring topology;
wherein said second node determines whether it is a second network connecting office of an arrangement in which the terminal office exists outside first and second network connecting offices, or a second network connecting office of an arrangement in which a terminal office exists intermediate first and second network connecting offices, this determination depending upon whether two offices consisting of a source office and a destination office that have been entered in a source-office name field and a destination-office name field, respectively, of the squelch table are arrayed in a sequence that agrees with an array sequence of the offices in the ring topology.

3. The method according to claim 1, wherein in an arrangement in which the terminal office exists outside the first and second network connecting offices, a node recognized as being the first network connecting office is said first node.

4. The method according to claim 1, wherein in an arrangement in which the terminal office exists intermediate the first and second network connecting offices, a node recognized as being the terminal office is said first node.

5. The method according to claim 1, wherein in a network arrangement in which first and second ring networks are connected via an intermediate ring network in which a channel is unterminated, said method of recognizing offices is applied to office recognition of first and second network connecting offices of the intermediate ring network for connection to the first ring network and to office recognition of third and fourth network connecting offices of the intermediate ring network for connection to the second ring network; and
office recognition of the entire intermediate ring network is performed by sending and receiving squelch tables, in which office identification information has been embedded, between a network connecting office on the side of the first ring network and a network connecting office on the side of the second ring network.

6. A method of recognizing offices of a ring network having first and second network connecting offices for connecting ring networks together and for dropping a signals from a terminal office, comprising the steps of:
recognizing at each node of the ring network, based upon channel setting information, whether the node is the first network connecting office of an arrangement in which the terminal office exists outside the first and second network connecting offices;
executing a procedure, which is for creating squelch tables of working and protection channels based upon the channel setting information, between a first node, which has been recognized as being the first network connecting office, and other nodes;

identifying a second node, which is the second network connecting office, at the first node by the procedure for creating a squelch table of the protection channel;

sending office identification information, upon embedding this information in the squelch table of the protection channel, from the first node to the second node; and recognizing, at the second node, that this node is the second network connecting office based upon the office identification information.

7. The method according to claim 6, wherein the office identification information is information specifying a range of the working channel obtained when a squelch table of the working channel is created; and
on the basis of this information, said second node recognizes that it is the second network connecting office and recognizes which node is the first network connecting office and which node is the terminal office.

8. The method according to claim 7, wherein the information specifying the range of the working channel is office identification information of the first network connecting office and of the terminal office;
the first node enters this information in a source-office name field and a destination-office name field of the squelch table of the protection channel and sends the squelch table to the second node; and
the second node, by ascertaining that this office identification information is different from its own office identification information, recognizes that it is the second network connecting office and recognizes the first network connecting office and the terminal office.

9. The method according to claim 8, further comprising a step of constructing a ring topology;
wherein if an array sequence of two offices consisting of a source office and a destination office that have been entered in a source-office name field and a destination-office name field, respectively, of the squelch table differs from an array sequence of the offices in the ring topology, said second node determines that it is a second network connecting office of an arrangement in which the terminal office exists outside first and second network connecting offices.

10. A method of recognizing offices of a ring network having first and second network connecting offices for connecting ring networks together and for dropping a signals from a terminal office, comprising the steps of:
recognizing at each node of the ring network, based upon channel setting information, whether the node is the terminal office of an arrangement in which the terminal office exists intermediate the first and second network connecting offices;
executing a procedure, which is for creating squelch tables of working and protection channels based upon the channel setting information, between a first node, which has been recognized as being the terminal office, and other nodes;
identifying a second node, which is the second network connecting office, at the first node by the procedure for creating a squelch table of the protection channel;
sending office identification information, upon embedding this information in the squelch table of the protection channel, from the first node to the second node; and recognizing, at the second node, that this node is the second network connecting office based upon the office identification information.

11. The method according to claim 10, wherein the office identification information is information specifying a range of the working channel obtained when squelch tables of the working channel are created; and on the basis of this information, said second node recognizes that it is the second network connecting office and recognizes which node is the first network connecting office and which node is the terminal office.

12. The method according to claim 11, wherein the information specifying the range of the working channel is office identification information of the first network connecting office and of the terminal office;

the first node enters this information in a source-office name field and a destination-office name field of the squelch table of the protection channel and sends the squelch table to the second node; and the second node, by ascertaining that this office identification information is different from its own office identification information, recognizes that it is the second network connecting office and recognizes the first network connecting office and the terminal office.

13. The method according to claim 12, further comprising a step of constructing a ring topology;

wherein if an array sequence of two offices consisting of a source office and a destination office that have been entered in a source-office name field and a destination-office name field, respectively, of the squelch table differs from an array sequence of the offices in the ring topology, said second node determines that it is a second network connecting office of an arrangement in which the terminal office exists intermediate first and second network connecting offices.

* * * * *